(12) United States Patent
Chen et al.

(10) Patent No.: US 11,792,290 B2
(45) Date of Patent: Oct. 17, 2023

(54) METHODS TO ENABLE AUTOMATED M2M/IOT PRODUCT MANAGEMENT SERVICES

(71) Applicant: CONVIDA WIRELESS, LLC, Wilmington, DE (US)

(72) Inventors: Zhuo Chen, Claymont, DE (US); Dale N. Seed, Allentown, PA (US); Quang Ly, North Wales, PA (US); Jiwan L. Ninglekhu, Conshohocken, PA (US); Catalina Mihaela Mladin, Hatboro, PA (US); Lu Liu, Conshohocken, PA (US); William Robert Flynn, IV, Schwenksville, PA (US); Chonggang Wang, Princeton, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 17/420,404

(22) PCT Filed: Dec. 20, 2019

(86) PCT No.: PCT/US2019/067731
§ 371 (c)(1),
(2) Date: Jul. 2, 2021

(87) PCT Pub. No.: WO2020/142250
PCT Pub. Date: Jul. 9, 2020

(65) Prior Publication Data
US 2022/0086252 A1    Mar. 17, 2022

Related U.S. Application Data

(60) Provisional application No. 62/788,286, filed on Jan. 4, 2019.

(51) Int. Cl.
*H04L 67/567* (2022.01)
*H04W 4/70* (2018.01)
(Continued)

(52) U.S. Cl.
CPC ............ *H04L 67/567* (2022.05); *H04L 67/12* (2013.01); *H04L 67/562* (2022.05); *H04W 4/70* (2018.02)

(58) Field of Classification Search
CPC ..... H04L 67/567; H04L 67/12; H04L 67/562; H04W 4/70
See application file for complete search history.

(56) References Cited

U.S. PATENT DOCUMENTS

2016/0364223 A1    12/2016 Vandikas et al.
2018/0091506 A1*   3/2018 Chow ................... H04L 67/567
2018/0109650 A1*   4/2018 Berdy ..................... H04W 4/70

OTHER PUBLICATIONS

Hiroyuki et al., "Vehicular Domain Enablement", TR-0026-Vehicular Domain Enablement-V0_2_0.Zip, ONEM2M, Vol. Work Programme, Work Progr, No. version = v0.2.0, Mar. 16, 2016, pp. 1-49.

* cited by examiner

*Primary Examiner* — Kim T Nguyen
(74) *Attorney, Agent, or Firm* — BakerHostetler

(57) ABSTRACT

Methods and apparatuses are described herein for an automated product management (APM) service. An apparatus may receive from a second apparatus, at least one first request to enroll a third apparatus with a service layer associated with the second apparatus. The apparatus may send a second request to verify authenticity of the third apparatus and to generate a customized firmware or software for the third apparatus. The apparatus may send a third request to configure the third apparatus based on consent of a user of the third apparatus. The apparatus may send a (Continued)

response indicating whether the third apparatus has been enrolled with the service layer. The apparatus may receive a fourth request to diagnose or troubleshoot the third apparatus and a fifth request comprising information and the consent and requesting the fourth apparatus to perform at least one operation on the third apparatus.

7 Claims, 16 Drawing Sheets

(51) Int. Cl.
*H04L 67/12* (2022.01)
*H04L 67/562* (2022.01)

1200

Product Management
    Manufacturer 1:
        Supported Products:
            Product 1
            Product 2
        Supported Protocols:
            oneM2M Release 2
            oneM2M Release 3
        Supported Features:
            subscription
        Deployed Device:
            node 1
            node 2
            node 3
        Device Authentication Interface:
            xyz.com/auth
        Device Troubleshoot Interface:
            xyz.com/troubleshoot

FIG. 12

METHODS TO ENABLE AUTOMATED M2M/IOT PRODUCT MANAGEMENT SERVICES

CROSS-REFERENCE TO RELATED APPLICATIONS

This application is the National Stage Application of International Patent Application No. PCT/US2019/067731, filed Dec. 20, 2019, which claims the benefit of U.S. Provisional Patent Application No. 62/788,286, filed Jan. 4, 2019, which is hereby incorporated by reference in its entirety.

BACKGROUND

There is an explosive growth of IoT protocols, service providers, and manufacturers in M2M/IoT ecosystems. A manufacturer may manufacture IoT devices that support multiple IoT standards and service providers, but the manufacturer may not have the capability to provide M2M/IoT service to users that have purchased and use the device. A service provider may provide IoT services using one or multiple IoT standards and may allow its user to use devices that are made by multiple manufacturers/However, the service provider may not have the capability to design and make IoT devices. The fragmentation of IoT ecosystems also brings numerous challenges for IoT users, service providers, and manufacturers.

Accordingly, there is a need for improved M2M/IoT product management techniques.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for an automated product management (APM) service. In accordance with one embodiment, an apparatus may receive from a second apparatus, at least one first request to enroll one or more third apparatuses with a service layer associated with the second apparatus. The apparatus may send, to a fourth apparatus, a second request for the fourth apparatus to verify authenticity of the one or more third apparatuses and to generate a customized firmware or software for the one or more third apparatuses. The apparatus may send a third request to configure the one or more third apparatuses based on consent of a user of the one or more third apparatuses. The apparatus may send a response indicating whether the one or more third apparatuses have been enrolled with the service layer. The apparatus may receive a fourth request to diagnose or troubleshoot the one or more third apparatuses. The apparatus may send, to the fourth apparatus, a fifth request comprising information and the consent and requesting the fourth apparatus to perform at least one operation on the one or more third apparatuses.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIG. 12 is a diagram of an example user interface;

DETAILED DESCRIPTION OF ILLUSTRATIVE EMBODIMENTS

Figure 1:
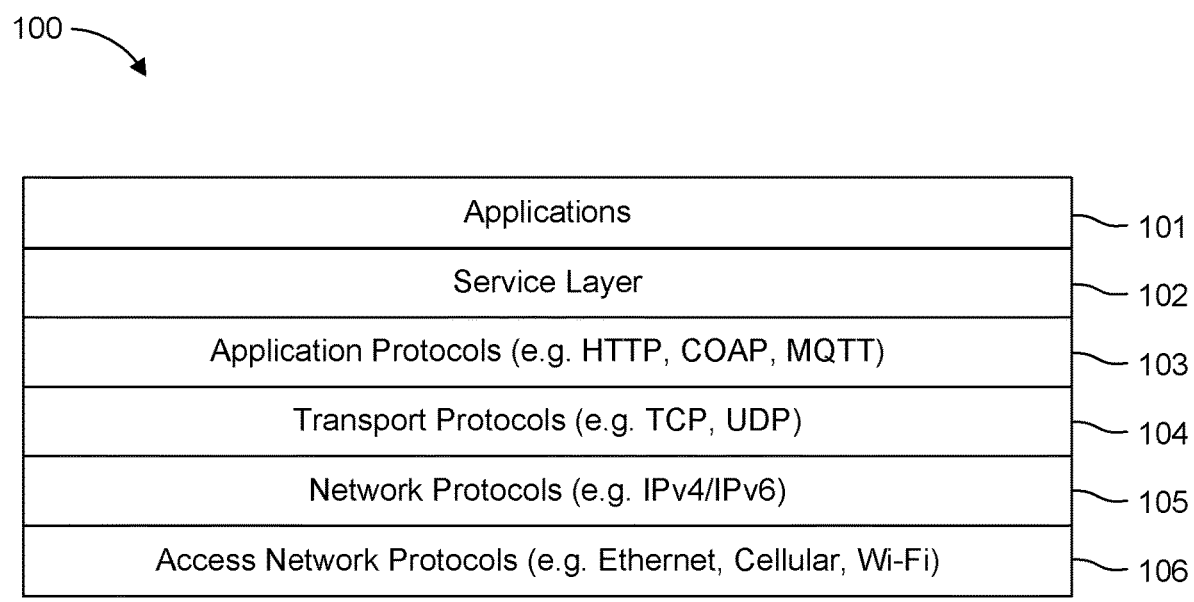
FIG. 1 is a diagram of an example protocol stack supporting an M2M/IoT service layer.

Methods and apparatuses are described herein for a service layer (SL) capability to assist device users and manufacturers in the maintenance and management of their IoT devices. The methods and apparatuses described herein enable device users to keep their devices online, fully functional and secure without having to interact directly with each manufacturer. The methods and apparatuses described herein enable device manufacturers to obtain device information and to fix defects of deployed devices without direct interaction with each user.

APM Service enabled device enrollment and registration procedures are described herein. A manufacturer registration procedure is described herein for a manufacturer to enable its products to be deployed within the SL. An enhanced SL enrollment procedure is described herein to enable a SL user to use its Point of Contact Device/Application to keep their devices fully compatible and securely connected, which will prevent security threats for the user and other devices in the system. An enhanced SL registration procedure is described herein to enable an IoT device manufacturer to obtain the current deployment and configuration information about its devices deployed in the field without direct interaction with individual device users. An APM Service enabled automated troubleshooting procedure is described herein to enable IoT device users to have their devices troubleshooted automatically by the manufacturer when they encounter an error. An APM Service enabled automated SL recall procedure is described herein to enable IoT manufacturers to indirectly contact and notify the users of devices deployed in the field and remotely fix firmware or software defects of deployed devices without direct interaction with individual device users.

The following is a list of abbreviations of terms as used herein:
- ACP Access Control Policy
- ADN Application Dedicated Node
- AE Application Entity
- API Application Programming Interface
- APM Automated Product Management
- ASN Application Service Node
- CSE Common Service Entity
- CSF Common Service Function
- IN Infrastructure Node
- IoT Internet of Things
- IP Internet Protocol
- M2M Machine to Machine
- MN Middle Node
- NSE Network Service Entity
- PoA Point of Access
- PoC Point of Contact
- SL Service Layer
- URI Uniform Resource Identifier
- URL Uniform Resource Locator The following is a list of definitions of terms as used herein:

M2M/IoT SL: A software middleware layer that may support value-added services for M2M/IoT applications and devices through a set of Application Programming Interfaces (APIs) and underlying networking interfaces.

M2M/IoT Application: An application that may target a particular M2M/IoT use case (e.g. eHealth, smart energy, home automation).

Registrar Entity: An SL entity that another SL entity may register to.

Registree Entity: An SL entity that may register with another SL entity.

SL Entity: An M2M/IoT Server, an M2M/IoT Gateway, an M2M/IoT Device, or a resource in the M2M/IoT Area Network, the M2M/IoT Application Layer, or the M2M/IoT Service Layer software components.

SL Resource: A uniquely addressable entity in the M2M/IoT SL.

An M2M/IoT Service Layer (SL) comprises technology targeted towards providing value-added services for M2M/IoT devices and applications. M2M/IoT SLs are being developed to address the challenges associated with the integration of M2M/IoT devices and applications into deployments with the Internet/Web, cellular networks, enterprise networks, and home network networks.

An M2M/IoT SL may provide applications and devices access to a collection of M2M/IoT capabilities. Examples include but are not limited to security, charging, data management, device management, discovery, provisioning, and connectivity management. These capabilities are made available to applications via APIs, which make use of message formats, resource structures, and resource representations supported by the M2M/IoT SL.

FIG. 1 is a diagram of an example protocol stack 100 supporting an M2M/IoT service layer. From a protocol stack perspective, middleware service layers are typically layered on top of existing network protocol stacks and provide value added services to client applications as well as other services. Hence, service layers are often categorized as "middleware" service layers. For example, FIG. 1 shows a service layer 102 located in between application protocols 103 and applications 101. As shown in the example of FIG. 1, the protocol stack 100 may include an applications layer 101, application protocols layer 103 (e.g. HTTP, COAP, MQTT), transport protocols layer 104 (e.g. TCP or UDP), network protocols layer 105 (e.g. IPv4 or IPv6) and access network protocols layer 106 (e.g. Ethernet, Cellular, Wi-Fi) in addition to the service layer 102. Service layer 102 instances may be deployed on various network nodes (gateways and servers) and may provide value-added services to network applications, device applications, and to the network nodes themselves.

The one M2M standard defines a M2M/IoT SL. The purpose of the SL is to provide "horizontal" services that can be utilized by different "vertical" M2M/IoT systems and applications, such as e-Health, fleet management, and smart homes.

Figure 2:
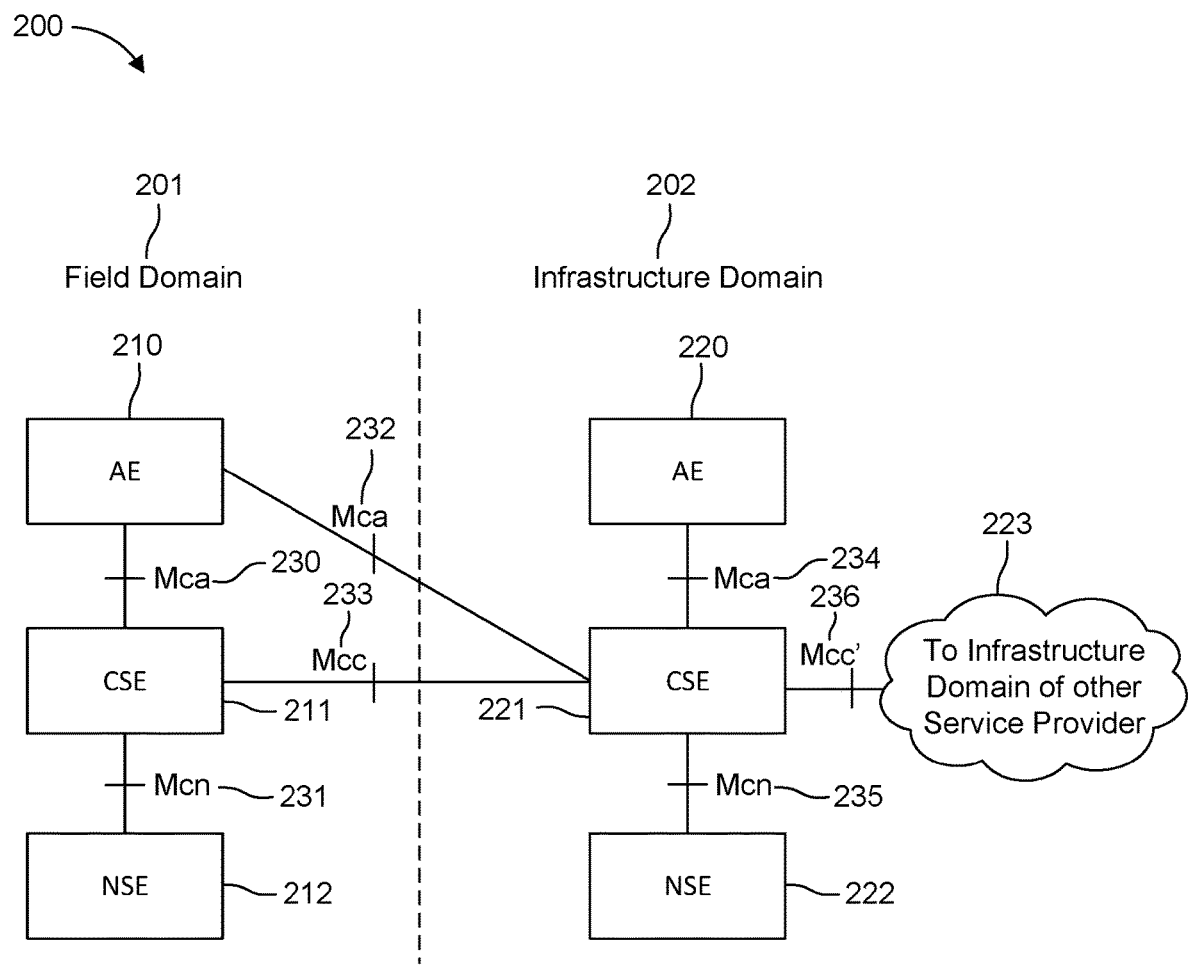
FIG. 2 is a diagram of an example one M2M architecture.

FIG. 2 is a diagram of an example one M2M architecture 200. The architecture 200 of the one M2M SL may comprise a Common Service Entity (CSE) that may support four reference points. The Mca reference point may interface with the Application Entity (AE). The Mcc reference point may interface with another CSE within the same service provider domain, and the Mcc' reference point may interface with another CSE in a different service provider domain. The Mcn reference point may interface with the underlying network service entity (NSE). An NSE may provide underlying network services to the CSEs, such as device management, location services and device triggering. As shown in the example of FIG. 2, in the field domain 201, AE 210 interfaces with the Mca reference point 230 and Mca reference point 232. CSE 211 interfaces with Mcc reference point 233, which interfaces with CSE 221 in the infrastructure domain 202. NSE 212 interfaces with Mcn reference point 231. In the infrastructure domain 202, AE 220 interfaces with the Mca reference point 234. CSE 221 interfaces with Mcc' reference point 236 to the infrastructure domain of another service provider 223. NSE 222 interfaces with Mcn reference point 235.

A CSE may comprise multiple logical functions referred to as Common Service Functions (CSFs). CSFs include but are not limited to discovery and data management & repository.

Figure 3:
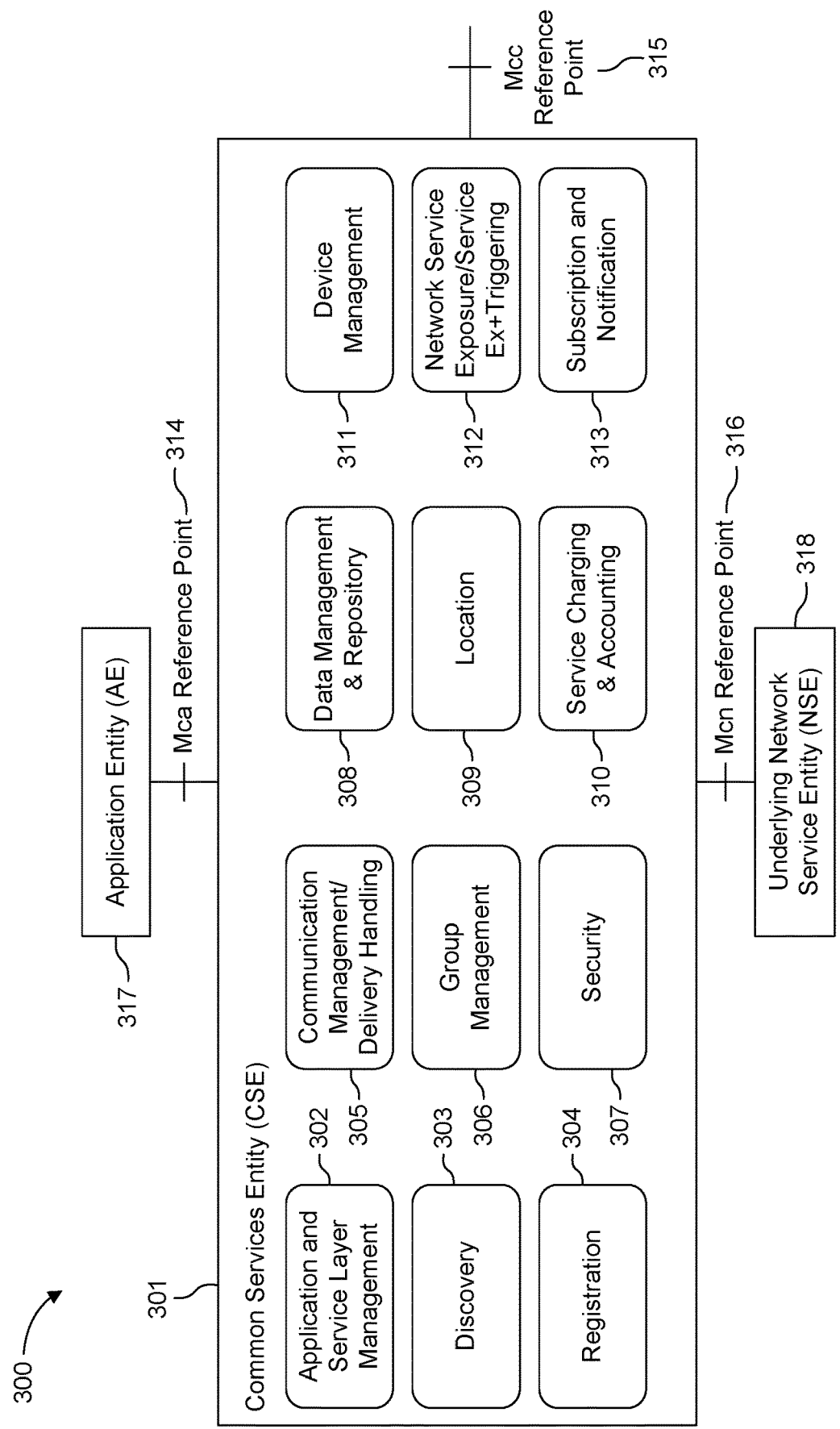
FIG. 3 is a diagram of an example set of common service functions (CSF)

FIG. 3 is a diagram of an example set of common service functions (CSF) 300 supported in one M2M. The service layer is enabled functionally by CSFs. A group of CSFs may be instantiated as a group on Common Services Entities (CSEs) 301 as shown in FIG. 3. Examples of CSFs and their functionality may include the following:

Application and service layer Management CSF 302: may provide management of AEs and CSEs.

Discovery CSF 303: may search for information about applications and services based on some filter criteria.

Registration CSF 304: may provide the functionality for AEs (or other remote CSEs) to register with a CSE. This may allow the AEs (or the remote CSE) to use the services of the CSE.

Communication Management/Delivery Handling CSF 305: may provide communications with other CSEs, AEs and NSEs. This CSF may decide at what time and which communication connection for delivering communications and if necessary and allowed, to buffer communications request so that they may be forwarded at a later time.

Group Management CSF 306: may provide for the handling of group related requests and enables an M2M system to support bulk operations for example, on multiple devices, applications, etc.

Security CSF 307: may provide security functions for the service layer, such as access control including identification, authentication, and authorization.

Data Management and Repository CSF 308: may provide data storage and mediation functions (for example, collecting data for aggregation, re-formatting data, and storing data for analytics and semantic processing).

Location CSF 309: may provide the functionality to enable AEs to obtain geographical location information.

Service Charging & Accounting CSF 310: may provide charging functions for the service layer Device Management CSF 311: may provide management of device capabilities on M2M gateways and M2M devices.

Network Service Exposure, Service Execution and Triggering CSF 312: may manage communications with the Underlying Networks for accessing network service functions.

Subscription and Notification CSF 313: may provide functionality to allow for subscribing to an event and to be notified when this event occurs.

The one M2M architecture may provide for a CSE 301 to interface through the Mca reference point 314, Mcc (and Mcc') reference point 315, and Mcn reference point 316 to other entities including but not limited to: a AEs 317; other CSEs; and a Network Service Entity (NSE) 318 (i.e. the underlying network).

The one M2M architecture is a distributed architecture and supports deploying M2M/IoT services in a distributed manner across the following types of Nodes:

Application Service Node (ASN): An ASN is a Node that may contain one CSE and may contain at least one AE. Examples of physical mappings include but are not limited to: an ASN may reside in an M2M/IoT Device.

Application Dedicated Node (ADN): An ADN is a node that may contain at least one AE and may not contain a CSE. Examples of physical mappings include but are not limited to: an ADN may reside in a constrained M2M/IoT Device.

Middle Node (MN): A MN is a node that may contain one CSE and may contain zero or more AEs. Examples of physical mappings include but are not limited to: a MN may reside in an M2M/IoT gateway.

Infrastructure Node (IN): An IN is a node that may contain one CSE and may contain zero or more AEs. A CSE in an IN may contain CSE functions not applicable to other node types. Examples of physical mappings: an IN may reside in an M2M/IoT service infrastructure.

Non-one M2M Node (NoDN): A non-one M2M node is a node that does not contain one M2M entities (i.e., neither AEs nor CSEs). Such nodes may represent devices attached to the one M2M system for interworking purposes, including management.

Figure 4:
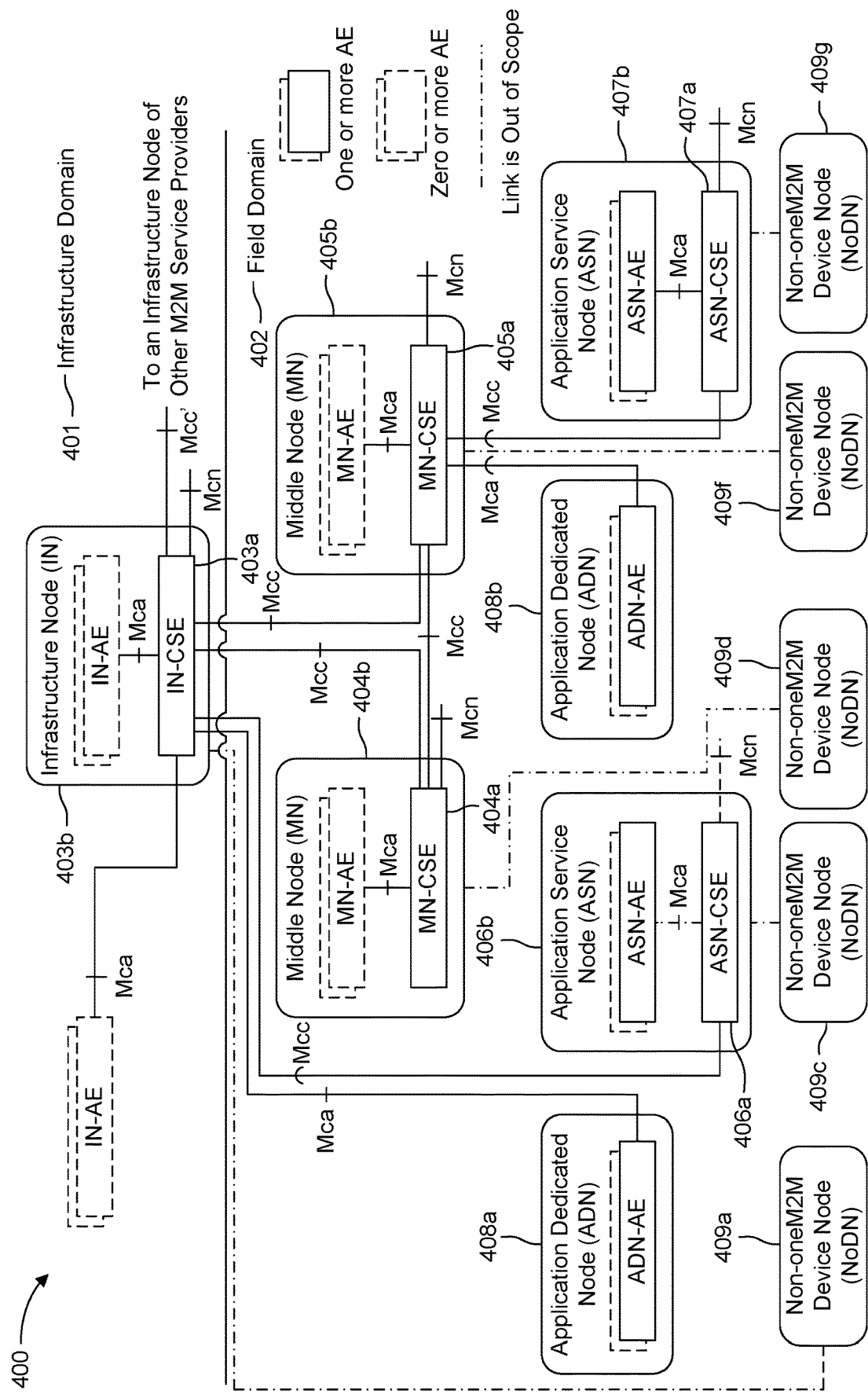
FIG. 4 is a diagram of an example distributive IoT system.

FIG. 4 is a diagram of an example distributive IoT system 400 such as one M2M, which may have a distributed architecture. The possible configurations of inter-connecting the various entities supported within the one M2M system are illustrated in FIG. 4. The system may comprise a plurality of IoT servers (also referred to herein as CSEs) that may be interconnected and may manage a plurality of IoT devices. The term IoT servers used herein may refer to cloud servers, edge gateways, or home gateways (i.e. any entity that offers IoT services within an IoT system). The architecture may be divided into two main domains: the infrastructure domain 401 and field domain 402. The infrastructure domain 401 may comprise cloud servers that serve as the main master controller of the system 400, which is represented in FIG. 4 as IN-CSE 403a in the Infrastructure Node 403b in FIG. 4. The field domain may comprise field deployed IoT servers located in various locations including but not limited to a factory, an office building, or a home. These servers are represented in FIG. 4 as MN-CSE 404a in Middle Node 404b and MN-CSE 405a in Middle Node 405b. The field domain 402 may also comprise mobile IoT servers running on mobile devices such as, for example, service trucks or mobile phones. These mobile devices are represented in FIG. 4 as ASN-CSE 406a in ASN 406b and ASN-CSE 407a in ASN 407b. IoT devices are represented in FIG. 4 as ADNs 408a and 408b and NoDNs 409a, 409c, 409d, 409f, and 409g with each node communicating to one of the CSEs in the system.

one M2M service layer registration is described herein. An AE on an ASN, an MN or an IN may perform registration locally with the corresponding CSE in order to use M2M/IoT services offered by that CSE. An AE on an ADN may perform registration with the CSE on an MN or an IN in order to use M2M/IoT services offered by that CSE. An IN-AE may perform registration with the corresponding CSE on an IN in order to use M2M/IoT services offered by that IN CSE.

The CSE on an ASN may perform registration with the CSE in the MN in order to be able to use M2M/IoT Services offered by the CSE in the MN. As a result of successful ASN-CSE registration with the MN-CSE, the CSEs on the ASN and the MN may establish a relationship allowing them to exchange information.

The CSE on an MN may perform registration with the CSE of another MN in order to be able to use M2M/IoT Services offered by the CSE in the other MN. As a result of successful MN-CSE registration with the other MN-CSE, the CSEs on the MNs may establish a relationship allowing them to exchange information.

The CSE on an ASN or on an MN may perform registration with the CSE in the IN in order to be able to use M2M/IoT Services offered by the CSE in the IN. As a result of successful ASN/MN registration with the IN-CSE, the CSEs on ASN/MN and IN may establish a relationship allowing them to exchange information.

In the above described cases, the AE or CSE performing the registration may be referred to as a registree AE or registree CSE. The CSE on which the AE/CSE is registering to may be referred to as the registrar CSE.

Following a successful registration of an AE to a CSE, the AE may be able to access, assuming access privilege is granted, the resources in all the CSEs that are potential targets of the request from the Registrar CSE. The following are some registration rules used in some systems:

(1) An AE may not be registered to more than one CSE (ASN-CSE, MN-CSE or IN-CSE);

(2) An ASN-CSE may be able to be registered to at most one other CSE (MN-CSE or IN-CSE);

(3) An MN-CSE may be able to be registered to at most one other CSE (MN-CSE or IN-CSE); and (4) A concatenation (registration chain) of multiple unidirectional registrations may not form a loop. For example. two MN-CSEs A and B, may not register with each other. In another example, three MN-CSEs A, B and C, where A registers to B, and B registers to C, then C may not register to A.

There is an explosive growth of IoT protocols, service providers and manufacturers in M2M/IoT ecosystems. A manufacturer may make IoT devices that support multiple IoT standards and service providers, but the manufacturer may not have the capability to provide M2M/IoT service to users who purchase and use the device. On the other hand, a service provider may provide IoT services using one or multiple IoT standards and may allow its user to use devices that are made by multiple manufacturers, but the service provider may not have the capability to design and make IoT devices. The fragmentation of IoT ecosystems as described above brings numerous challenges for IoT users, service providers and manufacturers.

One challenge is that an IoT user usually has little knowledge about IoT protocols and devices. When a user wants to purchase a smart home device from a seller that is not his IoT service provider, the user may not know whether the device can be fully compatible with the services offered by his IoT service provider. In another example, when the user encounters an error while using the device, the service provider cannot provide diagnosis troubleshooting services since it did not design or build the device. The user has to contact the manufacturer and then solve the problem by themselves.

Another challenge is that for an IoT manufacturer, the manufacturer loses the control and contact to a device that it makes once the device is sold to a distributor. For example, the manufacturer does not know who is using the device unless the user manually registers the product by itself via the Internet or via the post mail service. Moreover, the manufacturer may not know the present information about its products, for example, whether a product is in use or not. When the manufacturer finds a defect in the software or hardware of a particular product model, the manufacturer cannot easily notify the current users or remotely fix the defect automatically.

For an IoT service provider, when a user attempts to enroll a new IoT device that is manufactured by a third-party manufacturer, the service provider has limited knowledge about the device, and may not be able to provide the best service for the user. For example, the service provider cannot check the authenticity of the device in terms of whether the device is hacked, which may result in security threats for the user and other devices in the system. In another example, the device may be pre-installed with software or firmware that may not be fully compatible or support all features provided by the service provider's system.

There is an explosive growth of IoT deployments comprising various combinations of IoT devices built and sold by different manufacturers. For example, with the average home having increasing numbers of smart devices sold by different manufacturers, it is becoming increasingly difficult for the average home user to manage and maintain their smart home deployment. A home user may lack the due diligence and technical savviness to directly interface with device manufacturers to keep up with the proper maintenance upgrades (e.g. firmware upgrades, security patches, etc.) needed for proper and secure operation of each of its devices. Likewise, it is not uncommon for a manufacturer of IoT devices to lack the capability and expertise to maintain its customers IoT devices on their behalf. IoT Service Providers are well positioned to assist device users and manufacturers in the maintenance and management of their IoT devices.

Methods and apparatuses are described herein for a service layer capability, which may be referred to herein as an automated product management (APM) service, to provide enhanced services for IoT device users and manufacturers.

For IoT device users, the APM may provide service capabilities including but not limited to the following, for IoT device users to keep their devices online, fully functional and secure without having to interact directly with each individual device manufacturer:

(1) A capability for IoT device users to keep their devices updated with the latest software or firmware provided by the device manufacturers and that is also fully compatible with the service provider;

(2) A capability for IoT device users to keep their devices securely connected and not introduce security loopholes to the user and other devices in the system; and (3) A capability for IoT device users to have their devices diagnose and troubleshooted automatically by the manufacturer when they encounter an error.

For an IoT device manufacturer, the APM service may provide capabilities including but not limited to the following:

(1) the capability to obtain device information and to fix a defect of a deployed device without direct interaction with individual device users;

(2) the capability for IoT device manufacturers to obtain the current deployment and configuration information about its devices deployed in the field without direct interaction with individual device users;

(3) the capability for IoT device manufacturers to indirectly contact and notify the users of devices deployed in the field (e.g. when firmware upgrades of security patches are required or firmware is deprecated); and (4) the capability for IoT device manufacturers to remotely fix firmware or software defects of deployed devices without direct interaction with individual device users.

Methods and apparatuses are described herein or an SL APM function to provide enhanced services for an IoT device user by proxying the management of the IoT device user's products on behalf of device manufacturers and device users. In one example, enrollment requests may be received from one or more IoT SL users to enroll their devices with a service provider's service layer. For each request, enrollment information such as make, model, and user's point-of-contact address for each device, may be stored within the service provider's service layer. A request may be sent to the manufacturer of the product including the user's requirements and the user's consent for the manufacturer to check/verify the authenticity of the product, and generating a customized firmware or software for the user's product. A request, may be sent, to configure the device based on the user's requirement and consent. A response may be sent, to the IoT SL user, indicating whether they can enroll a product or whether their device is ready to use. A request may be sent from an IoT SL user to diagnose or troubleshoot its device. A request may be sent to the corresponding device manufacturer providing necessary information and the user's consent and asking the manufacturer to perform operations on the device.

In another embodiment, a SL APM function may provide enhanced services for an IoT device manufacturer by proxying the management of IoT device user's products on behalf of device manufacturers and device users. A manufacturer registration request may be received that comprises information associated with products that the manufacturer requests the SL to assist in managing. The information may include but is not limited to make and model, ranges of device identifiers and firmware/software images. A request may be sent to a manufacturer associated with the product information associated with a new device that registers with the SL. A request may be received from a manufacturer to perform a specified operation (e.g. update the firmware) on a type of product. The request may comprise information such as product make and model and one or more desired operations to be performed on the product by the service layer. Enrollment information stored within the service layer may be accessed to determine which devices match the make and model specified by the manufacturer's request. A request may be sent to a user's point-of-contact address of each matching device asking for the user's consent to perform the specified operation. A response may be received from the user that grants or denies the manufacturer's request. Requests may be sent to perform specified operations on the subset of devices whose consent was obtained from device users. Responses may be received from devices regarding the status of whether an operation was successfully performed or not on the devices. One or more responses may be sent to a device manufacturer containing status information of the devices that an operation was successfully or unsuccessfully performed upon. The status information such as manufacturer device identifiers or the reason of the failure may be included.

The APM service described herein may provide enhanced services for IoT device users and manufacturers. The APM Service may provide capabilities for IoT device users to keep their devices online, fully functional, and secure without having to interact directly with each individual device manufacturer. The APM Service may also provide capabilities for IoT device manufacturers to obtain device information and to fix defects of a deployed device without direct interaction with individual device users.

FIGS. 5 to 12 (described hereinafter) illustrate various embodiments associated with the framework for an APM service. In these figures, various steps or operations are shown being performed by one or more nodes, apparatuses, devices, servers, functions, or networks. For example, the apparatuses may operate singly or in combination with each other to effect the methods described herein. As used herein, the terms apparatus, network apparatus, node, server, device, entity, network function, and network node may be used interchangeably. It is understood that the nodes, devices, servers, functions, or networks illustrated in these figures may represent logical entities in a communication network and may be implemented in the form of software (e.g., computer-executable instructions) stored in a memory of, and executing on a processor of, a node of such network, which may comprise one of the architectures illustrated in FIG. 13A or 13B described below. That is, the methods illustrated in FIGS. 5 to 12 may be implemented in the form of software (e.g., computer-executable instructions) stored in a memory of a network node, such as, for example, the node or computer system illustrated in FIG. 13C or 13D, which may store computer-executable instructions, when executed by a processor of the node, that perform the steps illustrated in the figures and described herein. It is also understood that any transmitting and receiving steps illustrated in these figures may be performed by communication circuitry (e.g., circuitry 34 or 97 of FIGS. 13C and 13D, respectively) of the node under control of the processor of the node and the computer-executable instructions (e.g., software) that it executes. It is further understood that the nodes, devices, and functions described herein may be implemented as virtualized network functions.

Figure 5:
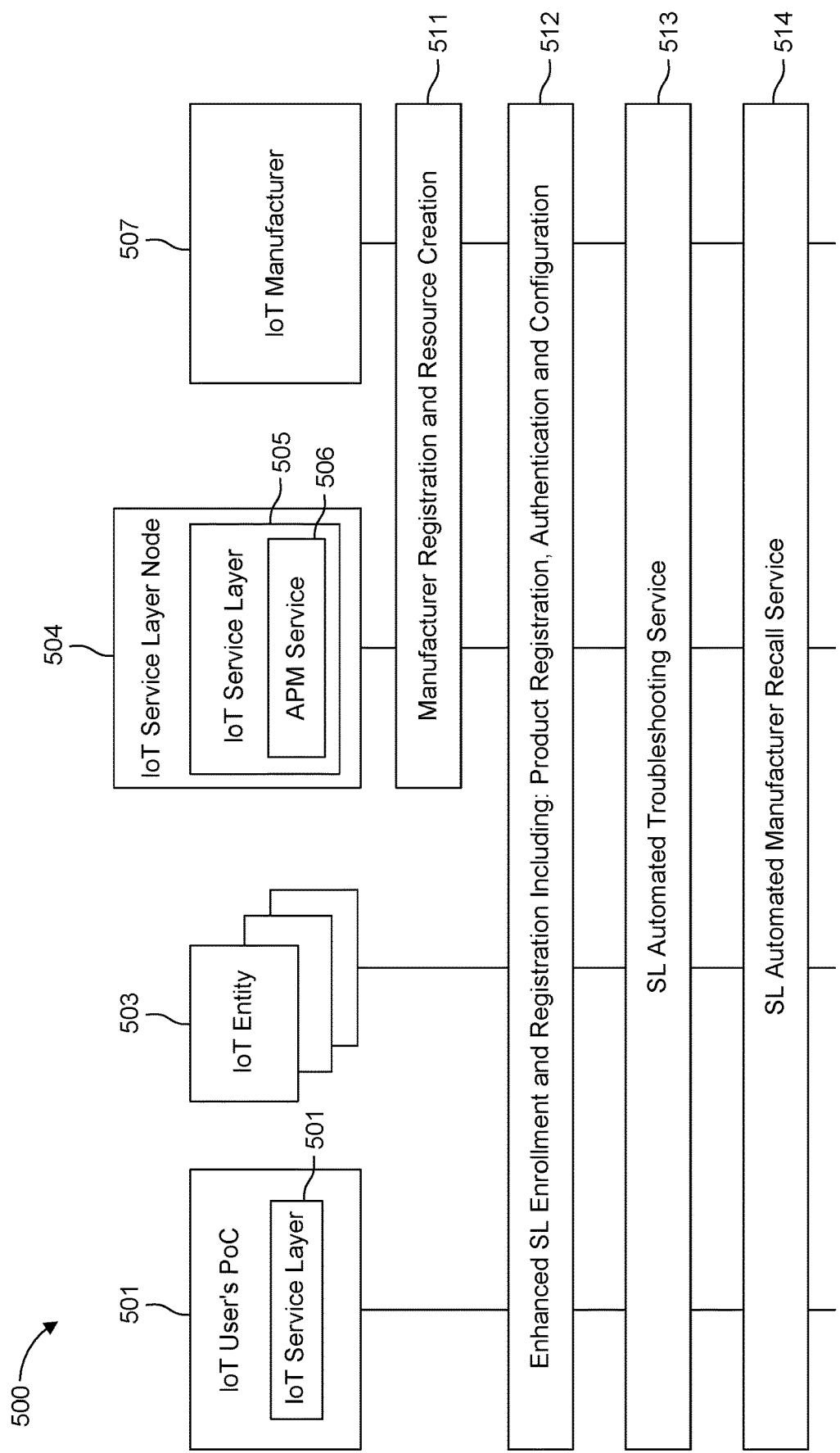
FIG. 5 is a diagram of a high-level example method performed by an APM service.

FIG. 5 is a diagram of a high-level example method 500 performed by an APM service, which may be used in any of the embodiments described herein. An APM service 506 may be deployed as a function within an IoT service layer 505 that is hosted on an IoT service layer Node 504, e.g. IoT Server, Gateway, Fog Node, Edge Node, as shown in FIG. 5. The APM Service 506 may also be deployed as its own independent service as well (not shown in FIG. 5). An APM service enabled SL enrollment and registration procedures is described herein. Next an APM Service enabled manufacturer registration procedure is described. During the manufacturer registration procedure, the SL may create resources to store information associated with the manufacturer, e.g. a list of products and features made by the manufacturer that may be deployed within the system, the parameter for generating customized software and/or firmware, SL subscription information of deployed devices and SL interface to check device authenticity, diagnose and troubleshoot.

Referring to FIG. 5, an IoT manufacturer 507 may perform registration and resource creation with an IoT service layer node 504 in the IoT service layer 505 providing an APM service 506 (step 511). An IoT user's point of contact (PoC) 501 via the IoT service layer 502 and IoT entity 503 may perform enhanced SL enrollment and registration comprising product registration, authentication, and configuration (step 512). SL automated troubleshooting services may be performed (step 513). SL automated manufacturer recall services (step 514).

The APM Service enabled device enrolment and registration procedures described herein may enable a SL user to use a PoC, which are the devices/applications employed by users to interact with SL to keep their devices fully compatible and securely connected and that do not introduce security threats for the user and other devices in the system. The procedures may also enable an IoT device manufacturer to obtain the current deployment and configuration information about its devices deployed in the field without direct interaction with individual device users. In addition, an APM Service enabled automated troubleshooting procedure described herein may enable IoT device users to have their devices troubleshooted automatically by the manufacturer when they encounter an error. In addition, an APM Service enabled automated SL recall procedure described herein may enable IoT manufacturers to indirectly contact and notify the users of devices deployed in the field and remotely fix firmware or software defects of deployed devices without direct interaction with individual device users.

Several APM Service enabled SL enrollment and registration procedures are described herein. First, a manufacturer registration procedure is proposed for a manufacturer to enable its products to be deployed within the SL. During the manufacturer registration procedure, the SL may create resources to store information associated with the manufacturer, e.g. a list of products and features made by the manufacturer that may be deployed within the system, the parameters for generating customized software and/or firmware, SL subscription information of deployed devices, and SL interface information for verifying device authenticity and troubleshooting devices. Second, an enhanced SL enrolment procedure is proposed to enable a SL user to use its Point of Contact, which are the devices or applications that a user may use to interact with SL, to keep their devices fully compatible and securely connected, which may prevent security threats for the user and other devices in the system. Third, an enhanced SL registration procedure is proposed to enable an IoT device manufacturer to obtain the current deployment and configuration information about its devices deployed in the field without direct interaction with individual device users.

Figure 6:
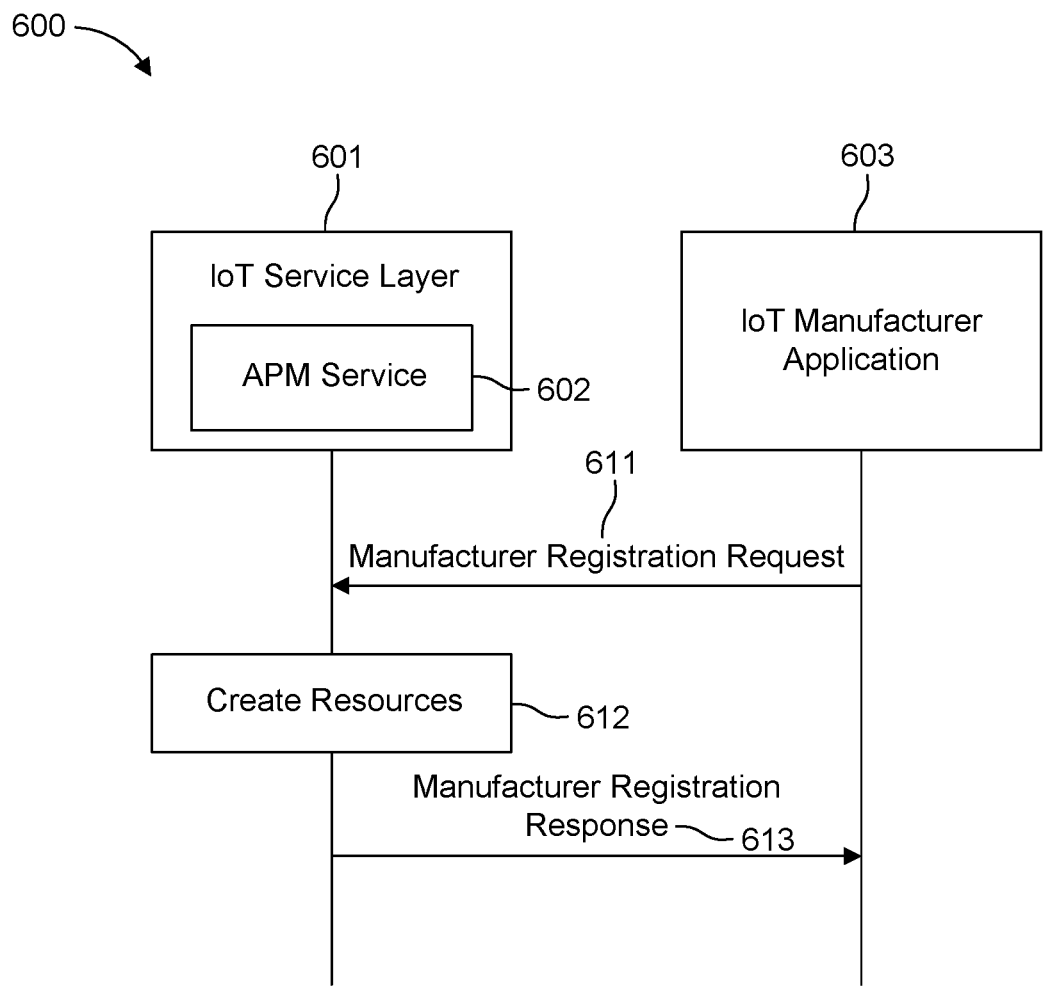
FIG. 6 is a diagram of an example APM Service enabled manufacturer registration procedure for a manufacturer to enable its products to be deployed within the SL.

FIG. 6 is a diagram of an example APM Service enabled manufacturer registration procedure 600 for a manufacturer to enable its products to be deployed within the SL in accordance with one embodiment, which may be used in combination with any of the embodiments described herein. During the manufacturer registration procedure, the SL may create resources to store information associated with the manufacturer, e.g., a list of products and features made by the manufacturer that may be deployed within the system, the parameters for generating customized software and/or firmware, SL subscription information about deployed devices, and SL interfaces for device authenticity verification and troubleshooting.

Referring to FIG. 6, an IoT manufacturer application 603 may send a manufacturer registration request to the IoT SL 601, hosted on an IoT service layer node (e.g. IoT Server, Gateway, Fog Node, Edge Node), that has deployed an APM service 602 as a function with the IoT SL 601, the request may comprise information as listed in Table 1 below (step 611). The IoT SL 601 may create resources associated with the manufacturer that comprise information as shown in Table 1 (step 612). The IoT SL 601 may assign a SL ID to the manufacturer if the manufacturer ID is not included in the request. The IoT SL 601 may send a manufacturer registration response to the IoT manufacturer application 603 to confirm that the resources are created (step 613).

After the registration, the manufacturer may also create a subscription to receive information about deployed devices that it produced. The SL may then create a resource subscription for the manufacturer to send it notifications, which may comprise information about devices that it produced that may be enrolled and registered to the system. The deployed device information may include the SL ID of the device, the model number, and the serial number of the device when it is shipped from the manufacturer.

Figure 7:
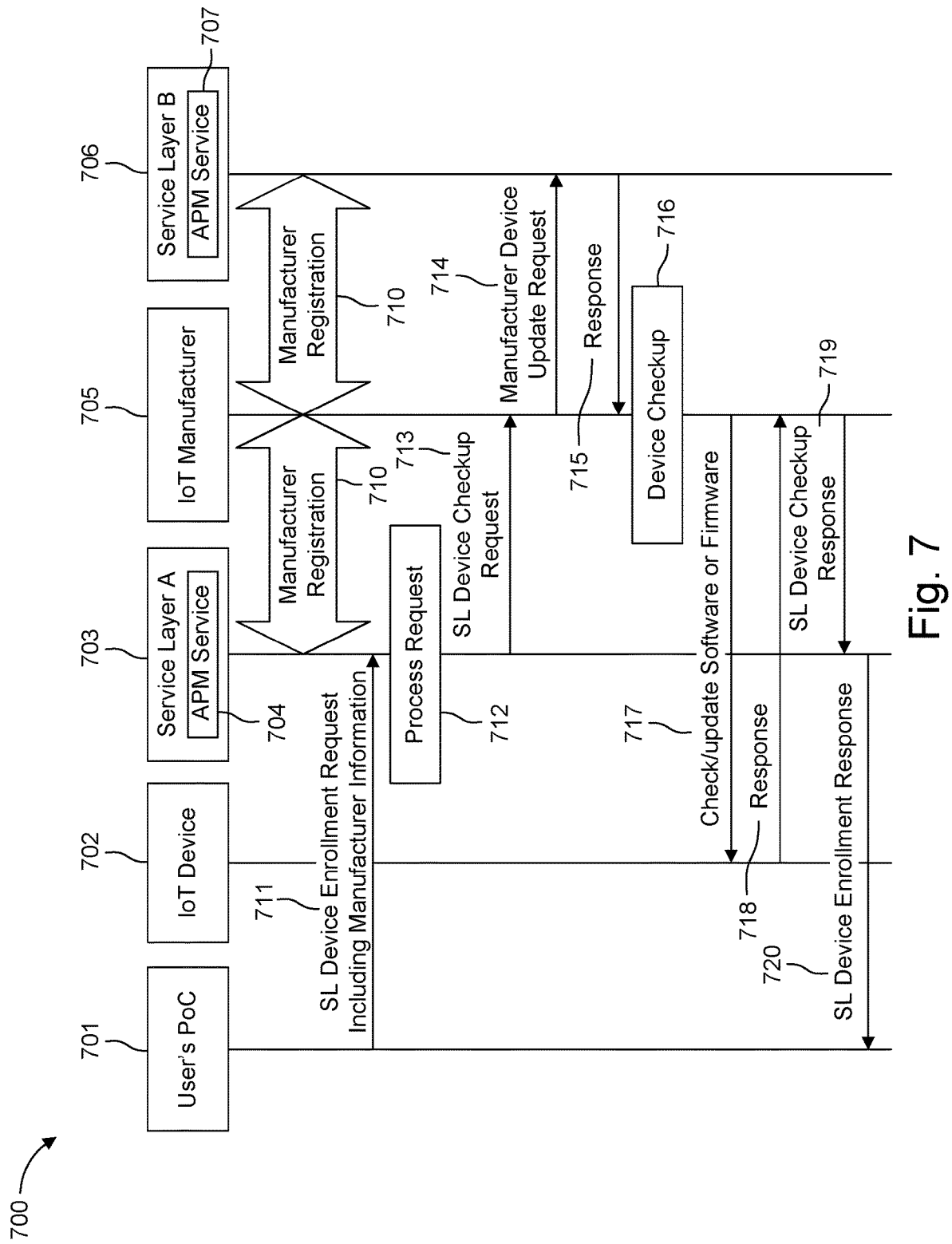
FIG. 7 is a diagram of an APM Service enabled SL enrollment procedure.

FIG. 7 is a diagram of an APM Service enabled SL enrollment procedure 700 in accordance with another embodiment, which may be used in combination with any of the embodiments described herein. The procedure 700 of FIG. 7 may enable a SL user to use its PoC to enroll a new device and determine whether the device is fully compatible, securely connected, and its authenticity is verified, which may help prevent security threats for the user and other devices in the system. The procedure 700 of FIG. 7 also may enable a SL user to know whether a device can be deployed to fulfill the requirements.

Referring to FIG. 7, the IoT manufacturer 705 may have registered its products with, for example service layer A 703 deploying an APM service 704 and service layer B 706 deploying APM service 707, using the method described above (step 710).

The SL user (i.e., user's PoC 701) may send a request to its SL (i.e. SL A 703) to enroll a new device to fulfill their requirement, e.g. the required SL protocol and features such as notification, data repository, device management, etc (step 711). The request may comprise information as shown in Table 2. The user may obtain the information in Table 2 from the printed text or QR code on IoT device 702, device package and/or device description found on manufacturer's website. This information may be shared with the SL using the user's PoC. The user may also obtain the information by communicating to the IoT device 702 using the user's PoC 701. The user may also provide its consent to allow the SL to communicate and share information about the user and/or IoT device 702 with the device manufacturer on the user's behalf. This consent information may specify a list of information that the SL is allowed or not allowed to share with the manufacturer.

TABLE 1

| Manufacturer Product Management (APM) Resources | |
|---|---|
| Attribute | Description |
| Manufacturer ID | The SL ID of the manufacturer. If the manufacturer does not have a SL ID during the registration, the SL assigns a SL manufacturer ID to the manufacturer. |
| Manufacturer Name | The name of the manufacturer |
| Supported Products | A list of products made by the manufacturer that can be deployed in SL and the products that the manufacturer is requesting the SL to help it to manage. |
| Supported Protocols | A list of protocols and protocol versions supported by the product made by the manufacturer that can be deployed in the SL. |
| Supported Features | A list of features supported by the product made by the manufacturer that can be deployed in SL. |
| Deployed Devices | Information about devices made by the manufacturer that are deployed in the SL. This may include the SL ID of the device. For each device, there is a Device State/Profile resource that may include the software name/ID, software update date and time, version, the user and the user's PoC, the consent to allow the SL to communicate and share information about the user and/or device with the device manufacturer on the user's behalf. This consent information can specify a list of information that the SL is allowed or not allowed to share with the manufacturer. |
| Device Authenticity Verification Interface | The interface that can be used to verify authenticity of the device that is deployed in SL. |
| Device Troubleshooting Interface. | The interface that can be used to troubleshoot devices deployed in the SL. |

TABLE 2

Information in SL Enrollment Request

| Attribute | Description |
| --- | --- |
| Manufacturer Name | The name of the manufacturer. |
| Manufacturer Interface | A URL for SL to contact the manufacturer |
| Product Model | The model number of the product |
| Product Serial Number | The serial number of the product |
| Network address | The network address of the device that can be reached or configurated. |
| Required SL Features | A list of SL features the enrolled device is required to support, e.g. the required SL protocol and features such as notification, data repository, device management, etc. |
| Product Management Policy | Store the consent to allow the SL to communicate and share information about the user and/or device with the device manufacturer on the user's behalf. This consent information can specify a list of information that the SL is allowed or not allowed to share with the manufacturer. |

SL A 703 may extract information from the enrollment request (step 712). If the manufacturer has registered to SL A 703, SL A 703 may check the APM resource in Table 1 that is associated with the manufacturer name in the request. Otherwise, SL A 703 may conditionally send a request to the IoT manufacturer 705 if given proper consent by the user. The request may be sent via the manufacturer interface to trigger the manufacturer registration procedure as described above. The request may comprise the SL protocol, e.g. one M2M, which SL A 703 may have employed. If only product model information and required features are provided along with manufacturer name, SL A 703 may check the supported products and supported features in the APM resource associated with the manufacturer, and may send an SL device enrollment response to the User's PoC 701 about whether the IoT device 702 can support the SL features that the user required as shown in step 720. Otherwise, SL A 703 may send a SL Device checkup request to the manufacturer to make sure the IoT device 702 to be enrolled is fully compatible, securely connected and authentic, which may prevent security threats for the user and other devices in the system as described in step 713.

SL A 703 may send a SL Device checkup request to the manufacturer (step 713). The request may comprise a serial number and network address of the IoT device 702, required SL features that the IoT device 702 is required to support, and other information listed in Table 3 below.

The IoT manufacturer 705 may extract information from the request (step 714). Based on the serial number contained in the request and product management information stored at the manufacturer as shown in Table 3, if the manufacturer finds the IoT device 702 has enrolled and registered with another SL, e.g. SL B 706, the manufacturer may send a request to report this information to SL B 706 in step 715. In the request, the manufacturer may include the information listed in Table 3 and may indicate that the IoT device 702 plans to enroll and register with another SL. Otherwise, the IoT manufacturer 705 may start a device checkup procedure as described in step 716.

TABLE 3

Product Management Information at a Manufacturer

| Attribute | Description |
| --- | --- |
| Device Serial Number | The serial number of the Device |
| Device SL Provider Information | The information of SL Provider the device is enrolled or registered. E.g. the name of the SL Provider. |
| Device SL ID | The SL ID of the Device in the SL Provider |
| Device User's Information | Information about the user who is using the device, e.g. the gender, age, and email address, if the user gives the consent. |
| Device Software Version | The version of software on the device. |
| Device Firmware Version | The version of firmware on the device. |
| Device Enabled Features | The features that are enable on the device. |

SL B 706 may check and/or update the SL enrollment information associated with the IoT device 702, and SL B 706 may send a response back to the manufacturer (step 715). In the response, SL B 706 may indicate whether to allow the IoT device 702 to enroll in another SL. If SL B 706 allows the IoT device 702 to enroll in another SL, it may remove information associated with the IoT device 702 after the IoT device 702 is enrolled in SL A 703. In an alternative, SL B 706 may indicate in the response it has notified the previous user, and/or obtain the consent whether the IoT device 702 is allowed to enroll in another SL.

If the IoT device 702 did not enroll and register with another SL, or SL B allowed the IoT device 702 to enroll in another SL, the IoT manufacturer 705 may starts a device checkup procedure (step 716). The IoT manufacturer 705 may generate a software or firmware for the IoT device 702 based on required features and the protocol that SL A 703 uses, and then may update the software and/or firmware on the IoT device 702 to make sure the IoT device 702 is fully compatible, securely connected, and authenticated as described in steps 717 and 718. Before the update, the IoT manufacturer 705 may also send a request to retrieve the software and/or firmware information to decide whether a software and/or firmware update is required. Alternatively, the IoT manufacturer 705 may perform the software and/or firmware update of the IoT device 702 indirectly via functionality supported within SL A 703 and/or SL B 706.

The IoT manufacturer 705 may send a request to check or update information on the IoT device 702, e.g. software and firmware (step 717). Alternatively, the manufacturer may perform this check indirectly via functionality supported within SL A 703 and/or SL B 706.

The IoT device 702 may send a response with device information and/or the confirmation of device update (step 718). Alternatively, the IoT device 702 may send this information via functionality supported within SL A 703 and/or SL B 706.

The IoT manufacturer 705 may send a SL Device checkup response to SL A 703 indicating whether the IoT device 702 can be enrolled in SL A 703 and is fully compatible and is authentic and securely connected with SL A 703 (step 719).

SL A 703 may send a SL device enrollment response to the user PoC 701 indicating whether the enrollment is successful or the IoT device 702 can be enrolled to fulfill the requirements (step 720).

Figure 8:
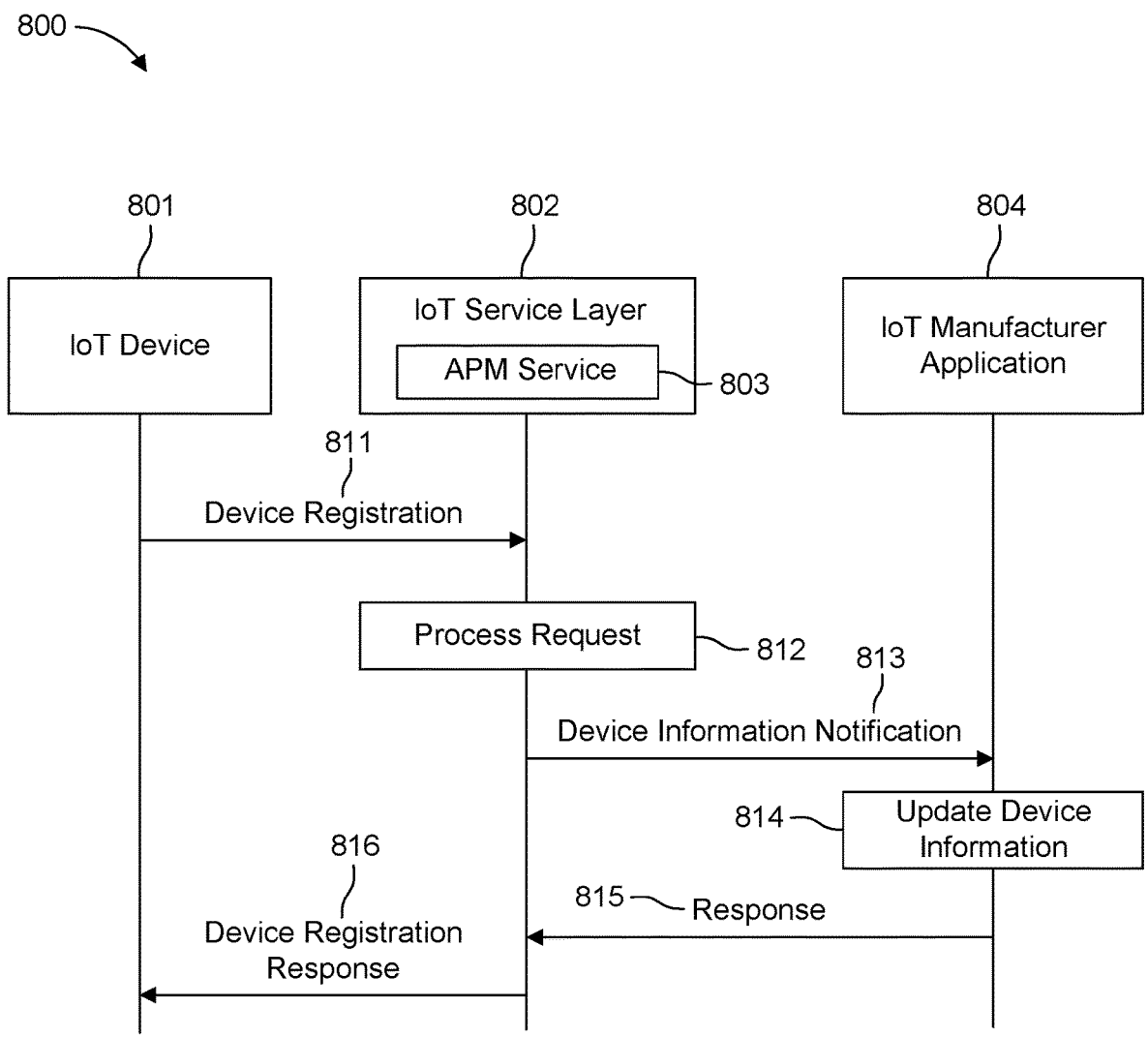
FIG. 8 is a diagram of an enhanced APM Service enabled SL registration procedure.

FIG. 8 is a diagram of an enhanced APM Service enabled SL registration procedure 800 in accordance with another embodiment, which may be used in combination with any of the embodiments described herein. The procedure 800 of FIG. 8 may enable an IoT device manufacturer to obtain the current deployment and configuration information about its devices deployed in the field without direct interaction with individual device users.

Referring to FIG. 8, the IoT Device 801 may send a device registration request to the IoT SL 802 deploying an APM service 803, the request may comprise the Uniform Resource Identifier (URI) of the manufacturer's interface, manufacturer name, model, product serial number, or version of software or firmware (step 811).

The IoT SL 802 may receive the device registration request and may process the request (step 812). The IoT SL 802 may check the SL enrollment information associated with the IoT device 801 as listed in Table 2. The IoT SL 802 may update the device in the deployed devices in the APM resource associated with the IoT manufacturer 804. Based on the IoT manufacturer's 804 resource subscription and the user's consent about information to share with the manufacture during the device enrollment, the SL may send a notification to the IoT manufacturer 804 comprising the information as listed in Table 3.

The IoT SL 802 may send a notification to the manufacturer comprising the information as listed in Table 3 (step 813).

The IoT manufacturer 804 may adds and/or update the product management information associated with the device (step 814).

The IoT manufacturer 804 may send a response to SL to confirm the update about product management information (step 815).

The IoT SL 802 may send a device registration response to the IoT device 801 to confirm the SL registration (step 816).

The manufacturer may also do a device checkup as requested by the IoT SL 802 to make sure that the device is fully compatible, securely connected and authentic as described above.

Figure 9:
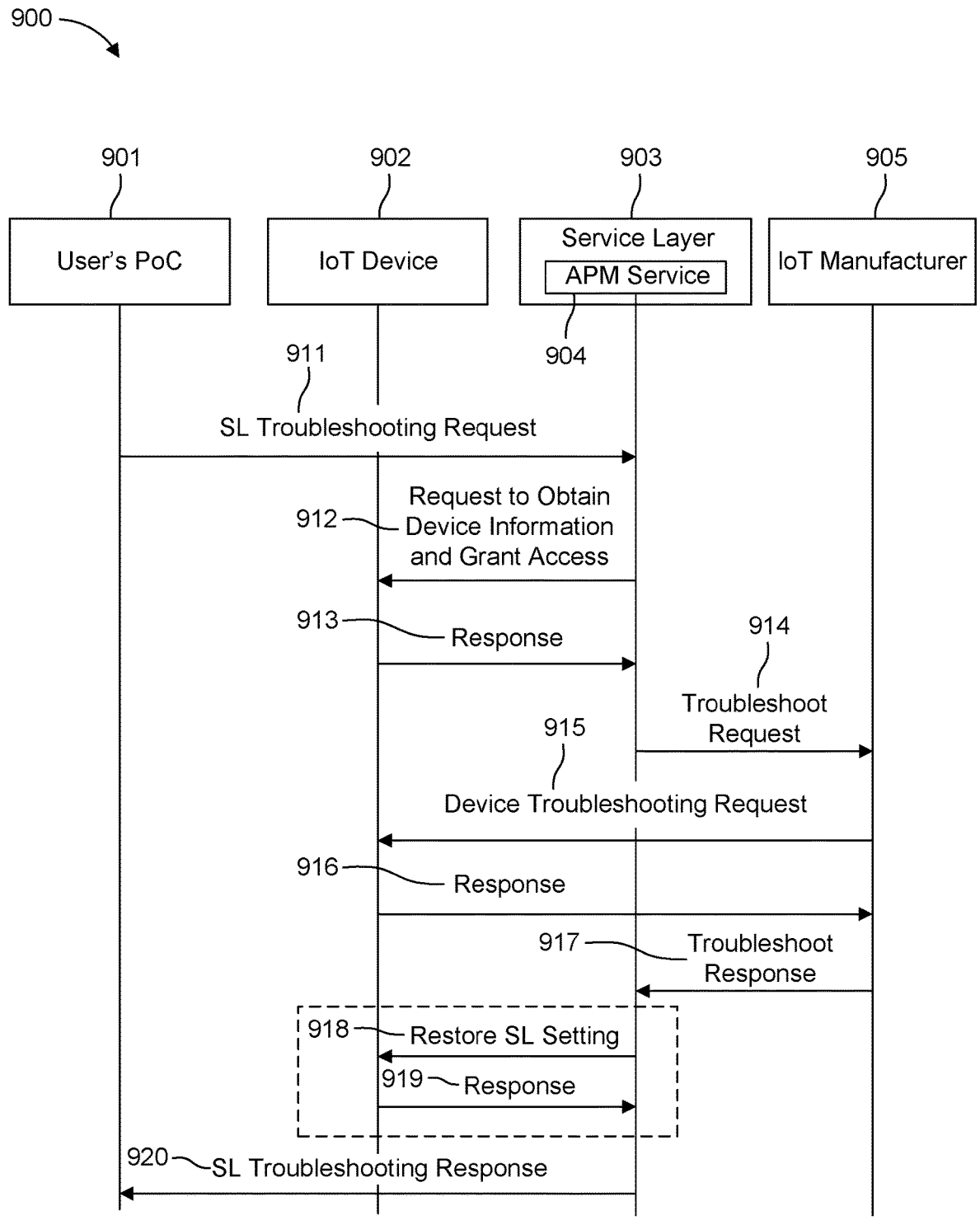
FIG. 9 is a diagram of an APM Service Enabled SL Troubleshooting Service procedure.

FIG. 9 is a diagram of an APM Service Enabled SL Troubleshooting Service procedure 900 in accordance with another embodiment, which may be used in combination with any of the embodiments described herein. The procedure 900 of FIG. 9 may enable IoT device users to have their devices troubleshooted automatically by the manufacturer when they encounter an error. In the procedure 900, when an IoT device user finds a device that is not working properly, they may use another SL device or application to send a troubleshooting request to the SL. The SL may also detect a problem with the IoT device. The SL may then conditionally obtain information from the device and may send this information to the manufacturer of the device on behalf of a user if the user has given its consent to the SL to do so. The SL may also grant access rights to the manufacturer to troubleshoot the device directly if the user has given its consent to do so. After the manufacturer may resolve the problem on the SL device, the SL may restore SL settings of the device, and then may notify the user the problem on the device is solved.

Referring to FIG. 9, the user 901 (e.g., the user's PoC) may send a SL troubleshooting request to the IoT SL 903 deploying an APM service 904 to report a problem of the IoT device 902 (step 911). The request may comprise the SL ID and/or the name of the IoT device 902. The request may also comprise the error information, e.g. error code, shown on the IoT device 902. The request may also comprise user consent information comprising information the IoT SL 903 may share with the manufacturer on behalf of the user 901.

The IoT SL 903 may obtain the manufacturer and product information associated with the faulty IoT device 901 from Table 1 (step 912). Based on the troubleshooting interface, the IoT SL 903 may then send a request to the faulty IoT device 902 to obtain information, device setting and troubleshooting information from the IoT device 902 if proper consent has been given by the user 901. The request may also update the access control on the IoT device 902 to grant the IoT manufacturer 905 the access to troubleshoot the IoT device 902. The access may be granted for a specified time period or may be only given for a specified type of operation.

The faulty IoT device 902 may send a response comprising the device settings and troubleshooting information (step 913). The IoT device 902 may also confirm that the access control policy is updated, which allows the IoT manufacturer 905 to troubleshoot the IoT device 902 directly.

The IoT SL 903 may send a troubleshoot request to the IoT manufacturer 905 (step 914). The request may comprise the troubleshooting information of the IoT device 902, e.g. the error code, and the network address of the IoT device 902.

Based on the troubleshooting information provided in the request, the IoT manufacturer 905 may start a device troubleshooting process, which for example, may comprise the manufacturer requesting the information about status of each component on the IoT device 902 (step 915). In another example, the manufacturer may update the software and/or firmware on the IoT device 902. The IoT manufacturer 905 may perform these operations by directly interacting with the IoT device 902. Alternatively, the IoT manufacturer 905 may perform these interactions indirectly via the IoT SL 903 using the SL device management capabilities.

The IoT device 902 may send a response to the IoT manufacturer 905 about detailed troubleshooting information and confirm that the software and/or firmware update (step 916). Alternatively, the device may relay this information back to the IoT manufacturer 905 via the IoT SL 903.

Based on the response, the IoT manufacturer 905 may obtain the reason of the faulty device and fix the problem if possible, and the IoT manufacturer 905 may then send the troubleshoot response to the IoT SL 903 (step 917). The troubleshoot response may include information about the reason of the problem, whether the problem is solved, and how the problem is solved or can be solved. For example, the IoT manufacturer 905 may suggest the user to push a button on the device or mail the product back to get a replacement. In another example, the manufacturer may indicate the problem has been solved via programing a new version of software or firmware.

In the case that manufacturer re-programs the software or firmware, the IoT SL 903 may initiate a procedure to restore the SL settings on the device (step 918). For example, this procedure may comprise configuring the device based on the user's SL profile. The IoT SL 903 may also revoke the access control rights of the manufacturer now that the issue on the device has been resolved.

The IoT device 902 may send a response to the IoT SL 903 to confirm the settings and access control update (step 919).

The IoT SL 903 may send a SL troubleshooting response to the user's PoC 901 notifying the user whether the problem is solved or how to solve the problem (step 920).

Figure 10:
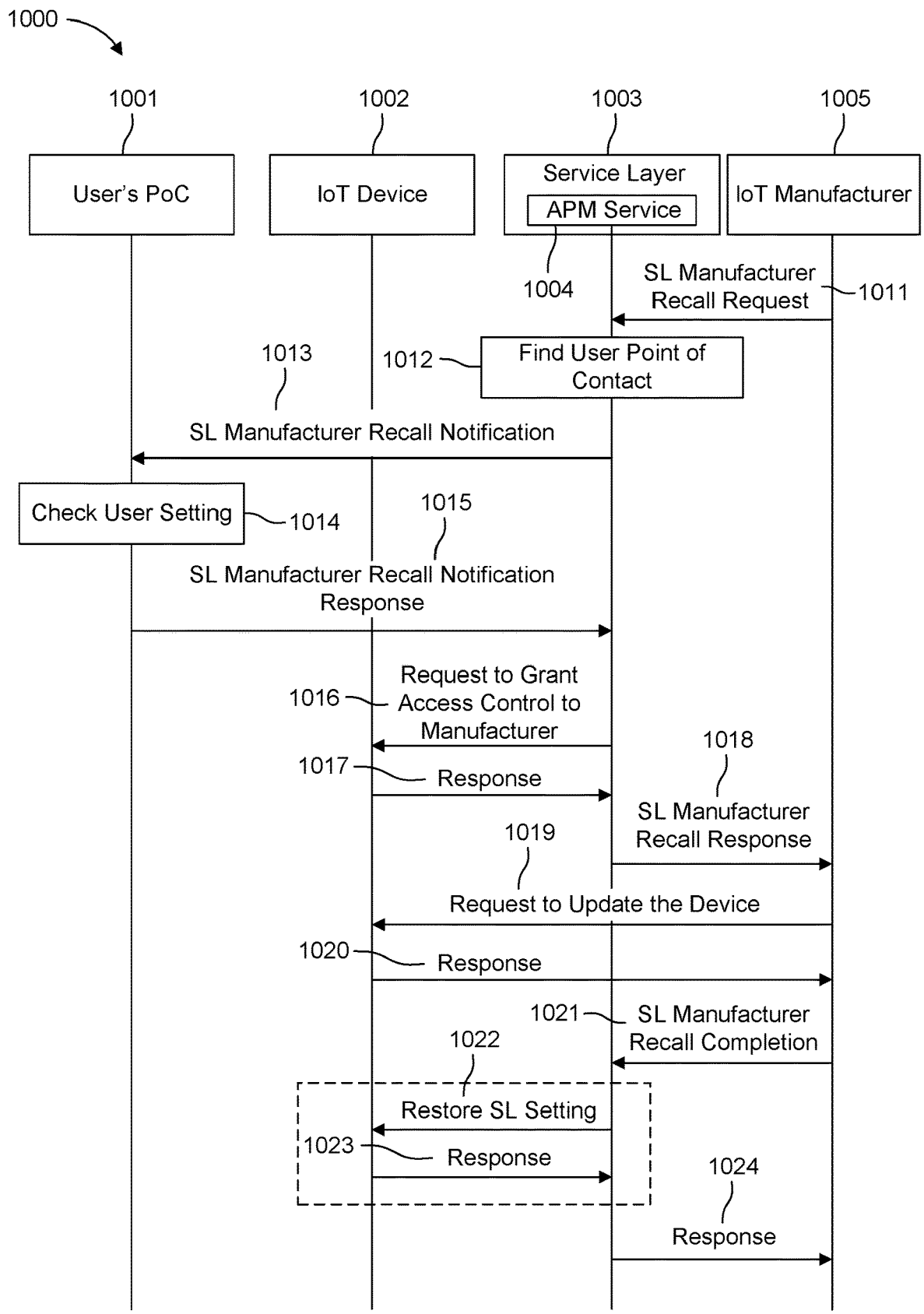
FIG. 10 is a diagram of an APM service enabled SL recall service procedure.

FIG. 10 is a diagram of an APM service enabled SL recall service procedure 1000 in accordance with another embodiment, which may be used in combination with any of the embodiments described herein. The procedure 1000 of FIG. 10 may enable IoT manufacturers to indirectly contact and notify the users of devices deployed in the field and to remotely fix a firmware or software defect of deployed devices without direct interaction with individual device users. In the procedure, when the manufacturer detects a defect in its product, e.g. security loophole, the manufacturer may check the Product Management Information stored in Table 3 and find devices that have the defect, and may send a SL recall request to the SL of the device. When the SL receives the request, the SL may contact and notify the user of the device about the problem. Based on the user's SL settings and/or consent, the SL may grant the access control of the device to the manufacturer. The manufacturer may then remotely update the firmware of software. Alternatively, the manufacturer may leverage device management capabilities of the SL to initiate device management operations on the device to fix the issue. The manufacturer may indicate in the SL recall request that the defects in the product cannot be fixed or a product may be no longer supported. In this scenario, the SL may disable these devices in the system and notify the user of the device about the problem.

Referring to FIG. 10, the IoT manufacturer 1005 may send a SL manufacturer recall request comprising the information about devices that are affected by the recall (step 1011). The information may include but is not limited to: product serial number, product model number, software version and/or firmware version. In the recall request, the IoT manufacturer 1005 may also propose the method for the recall. For example, if the recall is due to a hardware defect, the IoT manufacturer 1005 may request the IoT SL 1003 deploying an APM service 1004 to deliver the recall notification to the user of the device, such that the user is aware of the problem and obtain a replacement device via mail or go to an authorized dealer. In another example, if the recall is due to a software and/or firmware problem, the IoT manufacturer 1005 may request the IoT SL 1003 to obtain the users' consent and update the software and/or firmware. In yet another example, the IoT manufacturer 1005 may notify the SL about safety issues such that the SL can isolate the device or restrain the access control right of the device.

Based on the information in the request, the IoT SL 1003 may obtain the affected devices by checking information stored in Table 1, and the IoT SL 1003 may then obtain the user information associated with the devices (step 1012). If the user has given the consent for the IoT SL 1003 to handle any device recalls automatically, the IoT SL 1003 can skip to step 1016 to initiate the IoT SL 1003 recall. Otherwise, the IoT SL 1003 may send a SL manufacturer recall notification to the PoC of the user 1001, who is using the device, to obtain the consent as described in step 1013 to step 1015.

The IoT SL 1003 may send a SL manufacturer recall notification to the PoC of the user 1001 who is using the device (step 1013).

Based on the user's setting or response, the user's PoC 1001 may interact with the user to obtain user's permission for the recall service, or approve the recall request on behalf of the user based on the user's setting (step 1014).

The user's PoC 1001 may send a SL manufacturer recall notification response to confirm the delivery of the notification and indicates whether to approve the recall request (step 1015).

The IoT SL 1003 may send a request to the IoT device 1002 to obtain device settings and update the access control on the device to grant the manufacturer access to do the recalled service (step 1016). The access may be granted for a specified time period or may be only given for a specified type of operation.

The IoT device 1002 may send a response comprising its device setting information (step 1017). The device may also confirm the access control policy is updated, which allows the manufacturer to program the device directly.

The IoT SL 1003 may send a SL manufacturer recall response request to the manufacturer (step 1018). The request may comprise information about how to access the device, e.g. the network address of the device.

The IoT manufacturer 1005 may start a device update procedure to update the device, e.g. updating software and firmware (step 1019).

The IoT device 1002 may send a response to confirm the software and/or firmware update (step 1020).

The IoT manufacturer 1005 may send a SL manufacturer recall completion message to notify the IoT SL 1003 whether the recall service is completed (step 1021). The message may also include the information about the recall service, e.g. the new version number of software and/or firmware.

In the case that manufacturer re-programs the software or firmware, the IoT SL 1003 may initiate a procedure to restore the SL setting on the IoT device 1002 obtained from step 1017 (step 1022). For example, this procedure may comprise configuring the device based on the user's SL profile. The IoT manufacturer 1005 may also revoke the access control rights of the IoT manufacturer 1005. Based on the information in the SL manufacturer recall completion message, the IoT SL 1003 may also update the information about the IoT device 1002 and notify the user 1001 for the completion of the recall service. If the IoT manufacturer 1005 fails to complete the recall, IoT SL 1003 can notify the user 1001 about the problem such that the user 1001 can obtain a replacement device via mail or go to an authorized dealer. At the same time, the IoT SL 1003 can isolate the IoT device 1002 or restrain the access control right of the IoT device 1002.

The IoT device 1002 may send a response to the IoT SL 1003 to confirm the setting and access control update (step 1023).

Figure 11:
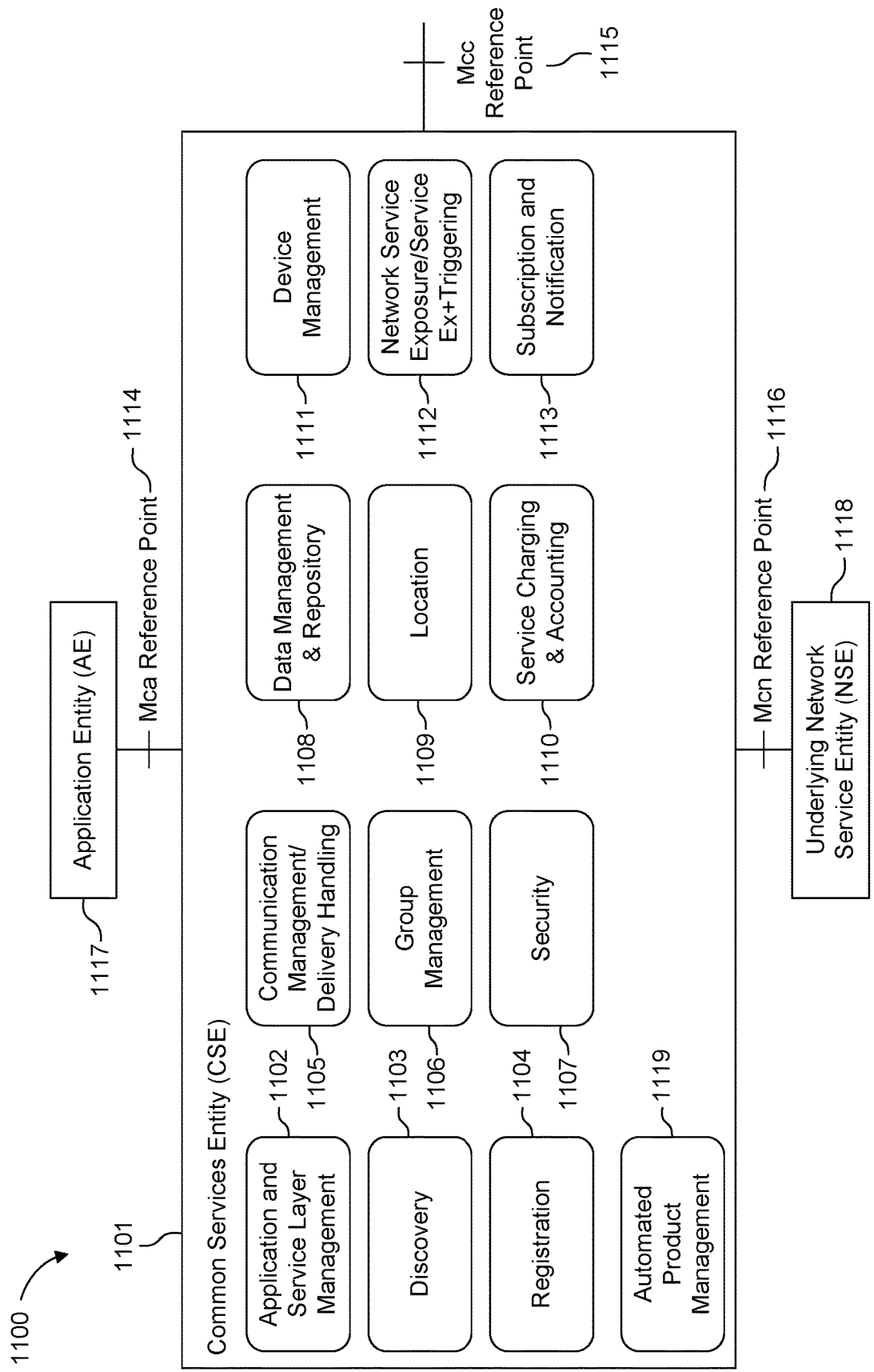
FIG. 11 is a diagram of an example one M2M service layer that supports a data brokerage CSF.

The IoT SL 1003 may send a response to the IoT manufacturer 1005 to confirm the receiving of the SL manufacturer recall completion message (step 1024).

one M2M resource-oriented architecture (ROA) embodiments are described herein. one M2M defines the capabilities supported by the one M2M Service Layer. The one M2M Service Layer may be instantiated as a CSE that comprises a set of CSFs. In one embodiment, the APM service described herein may be realized as a new CSF as shown in FIG. 11. CSEs may communicate via the Mcc and Mcc' reference points to manage registration. AEs may communicate via the Mca reference point to manage registration.

FIG. 11 is a diagram of an example one M2M service layer that supports a data brokerage CSF 1100. In the example of FIG. 11, the CSFs may include the following: Application and Service Layer Management CSF 1102; Discovery CSF 1103; Registration CSF 1104; Communication Management/Delivery Handling CSF 1105; Group Management CSF 1106; Security CSF 1107; Data Management and Repository CSF 1108; Location CSF 1109; Service Charging & Accounting CSF 1110; Device Management CSF 1111; Network Service Exposure, Service Execution and Triggering CSF 1112; and Subscription and Notification CSF 1113. The example of FIG. 11 also shows a CSE 1101 to interface through the Mca reference point 1114, Mcc (and Mcc') reference point 1115, and Mcn reference point 1116 to other entities including but not limited to: an AE 1117; other CSEs; and an NSE 1118 (i.e. the underlying network).

An Automated Product Management CSF 1119 may be implemented as a CSF as shown in the example of FIG. 11. This CSF may be hosted on various types of service layer nodes, such as IoT gateways and servers, and it may provide automated product services using resources hosted on that CSE 1101.

To support an APM service, new resources and attributes are proposed. In a one M2M embodiment, the APM CSF can support a APM resource such as a <manufacturerManagment> resource. A <manufacturerManagment> resource can be a child resource of <remoteCSE> and <AE>. The <manufacturerManagment> resource may comprise the resource specific attributes specified in Table 4 below. The <manufacturerManagment> resource may contain the child resources specified in Table 5 below.

TABLE 4

| Attribute of < manufacturerManagment> | | | |
|---|---|---|---|
| Attributes of < manufacturerManagment > | Multiplicity | RW/RO/WO | Description |
| manufactureID | 1 | WR | M2M-Node-ID of the node that is represented by this instance. |
| manufactureName | 1 | WR | M2M-User-ID of the user who is using the node |
| deployedDevice | 1 (L) | WR | A list of nodeID of devices made by the manufacturer that are deployed in the SL. |
| deviceAuthenticationInterface | 1 | WR | The interface that can be used to verify authenticity of the device that is deployed in SL. |
| deviceTroubleshootInterface | 1 | WR | The interface that can be used to troubleshoot devices deployed in the SL. |

TABLE 5

| Child resource of < manufacturerManagment > resource | | | |
|---|---|---|---|
| Child Resources of < manufacturerManagment > | Child Resource Type | Multiplicity | Description |
| [variable] | < supportedProducts > | 0 . . . n | Information about products made by the manufacturer that can be deployed in SL and that the manufacturer is requesting that the SL help it manage. |

A new <supportedProducts> resource is introduced under <manufacturerManagment> resource to store information about products made by the manufacturer that can be deployed in SL and that the manufacturer is requesting that the SL help it manage. The <supportedProducts> resource may comprise the resource specific attributes specified in Table 6 below.

TABLE 6

Attribute of < supportedProducts > Resource

| Attributes of < supportedProducts > | Multiplicity | RW/RO/WO | Description |
| --- | --- | --- | --- |
| productSerialNumber | 1 | WR | The serial number of the product |
| supportedProtocols | 1 (L) | WR | A list of protocols and protocol versions supported by the product made by the manufacturer that can be deployed in the SL. |
| supportedFeatures | 1 (L) | WR | A list of features supported by the product made by the manufacturer that can be deployed in SL. |

The new attributes of <serviceSubscribedNode> are proposed as highlighted in Table 7 below.

TABLE 7

Attribute of <serviceSubscribedNode>

| Attributes of < serviceSubscribedNode > | Multiplicity | RW/RO/WO | Description |
| --- | --- | --- | --- |
| nodeID | 1 | WO | M2M-Node-ID of the node that is represented by this instance. |
| userID | 1 | WO | M2M-User-ID of the user who is using the node |
| nodeFeatures | 0 . . . 1 (L) | WR | A list of SL features the node is required to support |
| mgmtPolicy | 1 (L) | WR | A list of information that the SL is allowed or not allowed to share with the manufacturer. |

FIG. 12 is a diagram of an example user interface 1200 that may be added to a M2M/IoT Server or on a user application to display product management information.

Figure 13A:
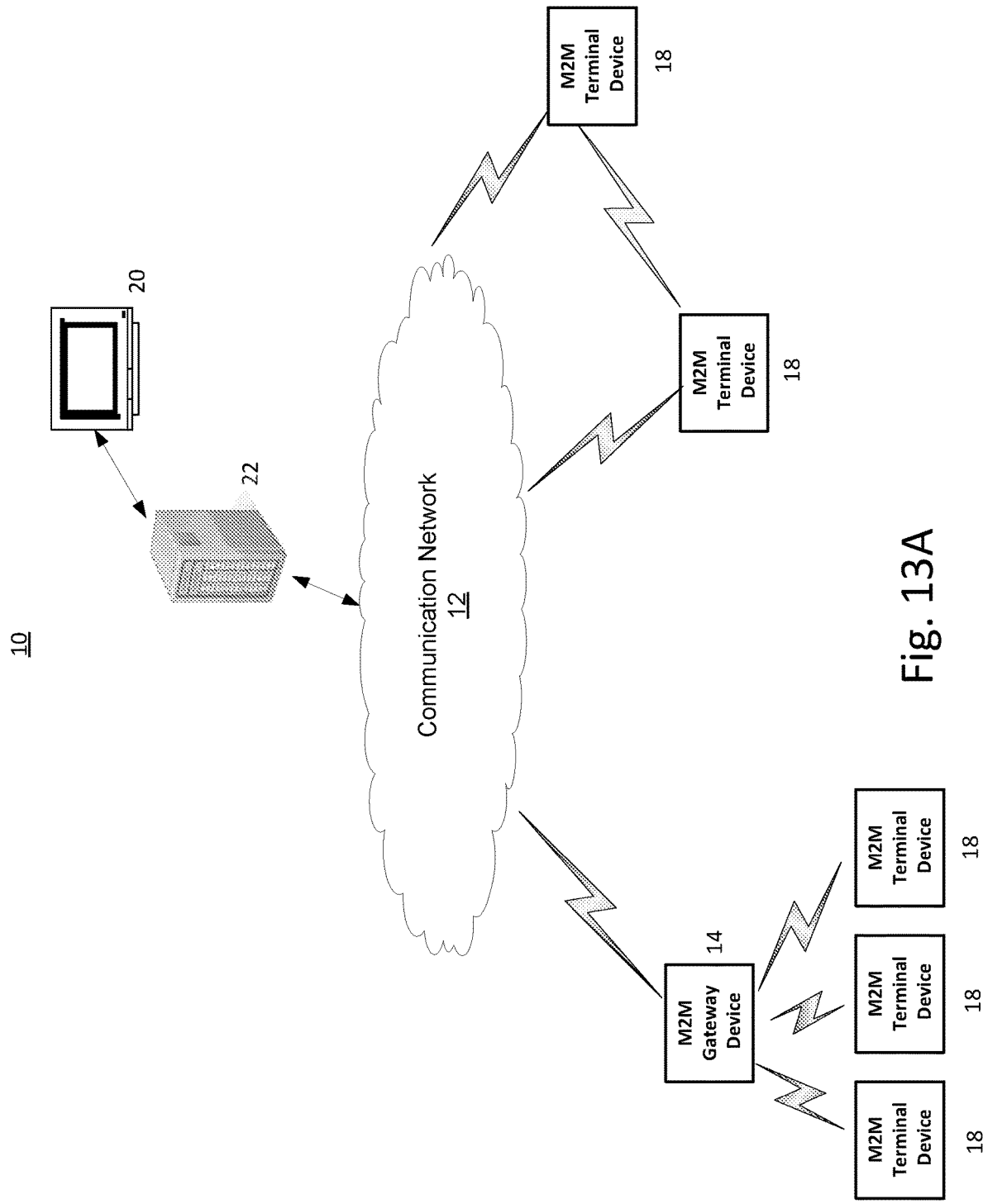
FIG. 13A is a system diagram of an example machine-to-machine (M2M) or Internet of Things (IoT) communication system in which one or more disclosed embodiments may be implemented.

FIG. 13A is a diagram of an example machine-to-machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway or M2M service platform may be a component of the IoT/WoT as well as an IoT/WoT service layer, etc. Any of the devices, functions, nodes, or networks illustrated in any of FIGS. 1 to 12 may comprise a node of a communication system such as the one illustrated in FIGS. 13A-B.

As shown in FIG. 13A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 13A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, devices, of the network. For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. A M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles personal digital assistants, health and fitness monitors, lights, thermostats, appliances, garage doors and other actuator-based devices, security devices, and smart outlets.

Figure 13B:
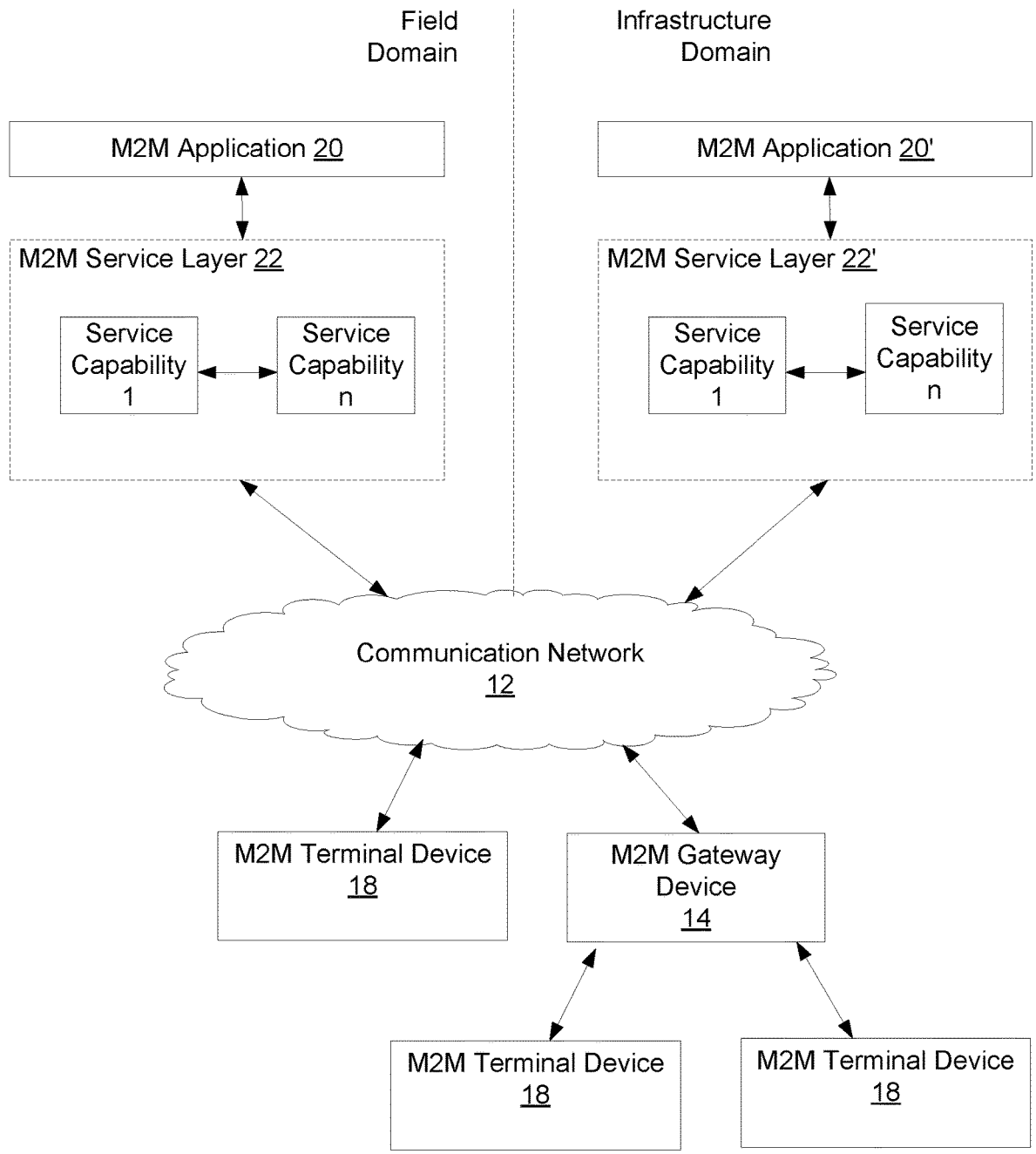
FIG. 13B is a system diagram of an example architecture that may be used within the M2M/IoT communications system illustrated in FIG. 13A.

Referring to FIG. 13B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Still referring to FIG. 13B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Generally, a service layer (SL), such as the service layers 22 and 22' illustrated in FIGS. 13A and 13B, defines a software middleware layer that supports value-added service capabilities through a set of application programming interfaces (APIs) and underlying networking interfaces. Both the ETSI M2M and one M2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The one M2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the one M2M architecture, or in some other node of a network, an instance of the service layer may be implemented in a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device, or the like) having the general architecture illustrated in FIG. 13C or 13D described below.

Further, the methods and functionalities described herein may be implemented as part of an M2M network that uses a Service Oriented Architecture (SOA) and/or a resource-oriented architecture (ROA) to access services, such as the above-described Network and Application Management Service for example.

Figure 13C:
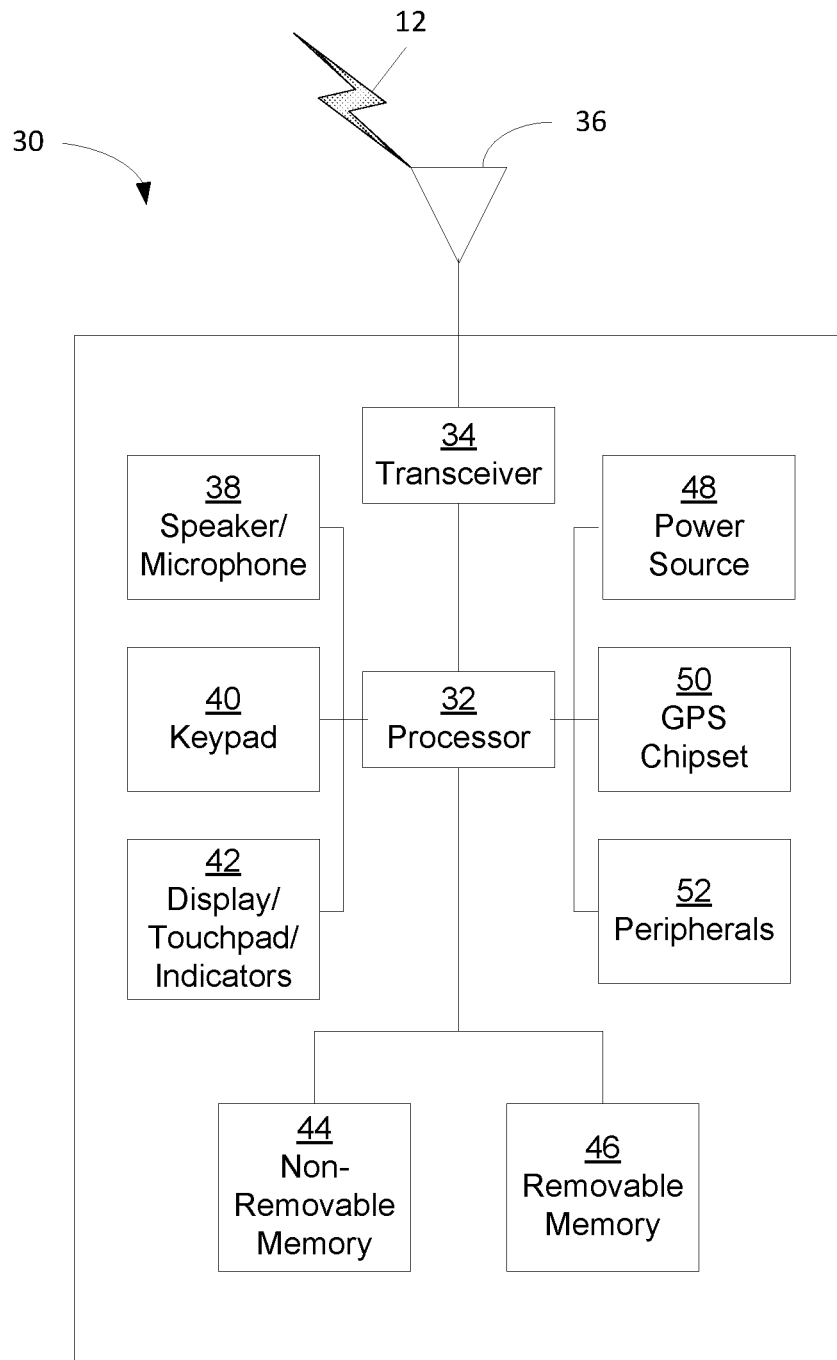
FIG. 13C is a system diagram of an example M2M/IoT terminal or gateway device that may be used within the communications system illustrated in FIG. 13A.

FIG. 13C is a block diagram of an example hardware/software architecture of a node of a network, such as one of the nodes, devices, functions, or networks illustrated in FIGS. 1 to 12, which may operate as an M2M server, gateway, device, or other node in an M2M network such as that illustrated in FIGS. 13A and 13B. As shown in FIG. 13C, the node 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the notifications and triggers related thereto described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the node 30 to operate in a wireless environment. The processor 32 may be coupled to the transceiver 34, which may be coupled to the transmit/receive element 36. While FIG. 13C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

As shown in FIG. 13C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 1-12) and in the claims. While FIG. 13C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 13C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of a node or configure a node (e.g., nodes in FIGS. 1-12), and in particular underlying networks, applications, or other services in communication with the UE. The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality, and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect devices, a vibration device, a television transceiver, a hands free headset, a Bluetooth® module, a frequency modulated (FM) radio unit, a digital music player, a media player, a video game player module, an Internet browser, and the like.

Figure 13D:
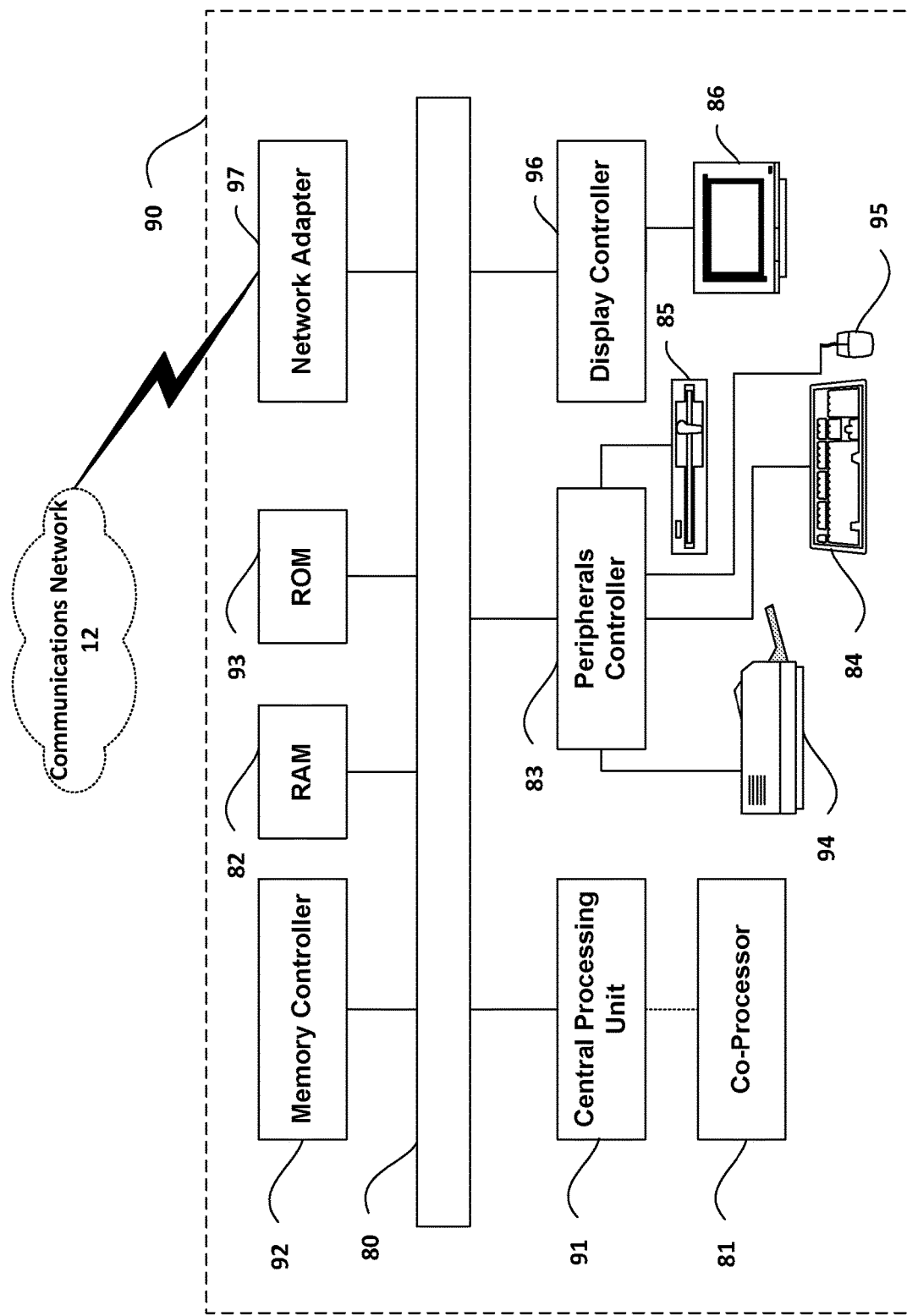
FIG. 13D is a block diagram of an example computing system in which aspects of the communication system of FIG. 13A may be embodied.

FIG. 13D is a block diagram of an exemplary computing system 90 which may also be used to implement one or more nodes of a network, such as nodes, devices, functions, or networks illustrated in FIGS. 1-12, which may operate as an M2M server, gateway, device, or other node in an M2M network such as that illustrated in FIGS. 13A and 13B. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, which performs additional functions or assists CPU 91. CPU 91 and/or coprocessor 81 may receive, generate, and process data related to the disclosed systems and methods for security protection.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97 that may be used to connect computing system 90 to an external communications network, such as network 10 of FIG. 13A and FIG. 13B, to enable the computing system 90 to communicate with other nodes of the network. The communication circuitry, alone or in combination with the CPU 91, may be used to perform the transmitting and receiving steps described herein (e.g., in FIGS. 1-12) and in the claims.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:

receiving, from a second apparatus, at least one first request to enroll one or more third apparatuses with a service layer associated with the second apparatus, wherein the at least one first request comprises user consent information specifying information associated with the one or more third apparatuses that the apparatus is allowed to share with a fourth apparatus;

determining, based on the user consent information provided in the at least one first request, a consent of a user of the one or more third apparatuses to share allowed information with the fourth apparatus associated with a manufacturer of the one or more third apparatuses;

sending, to the fourth apparatus, and based on the determined consent, a second request for the fourth apparatus to verify authenticity of the one or more third apparatuses and to generate a customized firmware or software for the one or more third apparatuses;

receiving, from the fourth apparatus, a first response indicating that the one or more third apparatuses are authentic;

sending, to the one or more third apparatuses, and based on the one or more third apparatuses being authentic, a third request to configure the one or more third apparatuses; and sending, to the second apparatus, a response indicating whether the one or more third apparatuses have been enrolled with the service layer.

2. The apparatus of claim 1, wherein the computer-executable instructions stored in the memory of the apparatus, when executed by the processor of the apparatus, further cause the apparatus to perform operations comprising:

receiving a fourth request to diagnose or troubleshoot the one or more third apparatuses; and sending, to the fourth apparatus, a fifth request comprising the allowed information and the determined consent and requesting the fourth apparatus to perform at least one operation on the one or more third apparatuses.

3. The apparatus of claim 1, wherein the at least one first request comprises enrollment information.

4. The apparatus of claim 3, wherein the enrollment information comprises at least one of make, model, and user Point of Contact (PoC) device or application address for each of the one or more third apparatuses.

5. The apparatus of claim 1, wherein the second apparatus comprises a user Point of Contact (PoC) device or user Point of Contact (PoC) application.

6. The apparatus of claim 1, wherein the one or more third apparatuses comprise one or more service layer devices.

7. The apparatus of claim 1, wherein the apparatus comprises at least one of a user equipment (UE), computing device, smartphone, gateway, server, or service provider.

* * * * *